US012657664B2

(12) United States Patent
Shi et al.

(10) Patent No.: US 12,657,664 B2
(45) Date of Patent: Jun. 16, 2026

(54) METHOD FOR MANUFACTURING MULTISPECTRAL IMAGE SENSOR, AND DEVICE THEREOF

(71) Applicant: ORBBEC INC., Guangdong (CN)

(72) Inventors: Shaoguang Shi, Shenzhen (CN); Zejia Huang, Shenzhen (CN); Dingjun Zhang, Shenzhen (CN); Longye Jiang, Shenzhen (CN); Wei Li, Shenzhen (CN)

(73) Assignee: Orbbec Inc., Shenzhen (CN)

( * ) Notice: Subject to any disclaimer, the term of this patent is extended or adjusted under 35 U.S.C. 154(b) by 416 days.

(21) Appl. No.: 18/374,171

(22) Filed: Sep. 28, 2023

(65) Prior Publication Data

US 2024/0020809 A1     Jan. 18, 2024

Related U.S. Application Data

(63) Continuation of application No. PCT/CN2022/080523, filed on Mar. 13, 2022.

(30) Foreign Application Priority Data

Jun. 3, 2021     (CN) ......................... 202110628920.8

(51) Int. Cl.
*G06T 5/50*          (2006.01)
*G06T 5/20*          (2006.01)
(Continued)

(52) U.S. Cl.
CPC .................. *G06T 5/50* (2013.01); *G06T 5/20* (2013.01); *G06V 10/143* (2022.01); *G06V 10/44* (2022.01);
(Continued)

(58) Field of Classification Search
CPC ... G06T 5/50; G06T 5/20; G06T 2207/10036; G06V 10/143; G06V 10/44; G06V 10/60;
(Continued)

(56) References Cited

U.S. PATENT DOCUMENTS 10,929,959 B2 *   2/2021   Kamio ............. A61B 1/000096
11,443,550 B2     9/2022   Ren et al.
(Continued)

FOREIGN PATENT DOCUMENTS

CN          102567968 A       7/2012
CN          111611977 A       9/2020
(Continued)

OTHER PUBLICATIONS

Brauers, Johannes, Nils Schulte, and Til Aach. "Multispectral filter-wheel cameras: Geometric distortion model and compensation algorithms." IEEE transactions on image processing 17.12 (2008): 2368-2380. (Year: 2008).*
(Continued)

*Primary Examiner* — Gregory A Morse
*Assistant Examiner* — Ronde Lee Miller
(74) *Attorney, Agent, or Firm* — Sheppard Mullin Richter & Hampton LLP

(57)          ABSTRACT

A method for manufacturing an image sensor, includes: obtaining feature parameter sets of filters corresponding to different wavelengths in a filter unit set, where the image sensor includes at least one filter unit set, the image sensor is manufactured in one of candidate manufacturing methods, and the feature parameter sets correspond to the candidate manufacturing methods; inputting the feature parameter sets of the filters and a preset parameter set into a feature vector conversion model, to obtain feature vectors based on detection targets; inputting the feature vectors into a detection model corresponding to an application scenario type asso-
(Continued)

S1801

Respectively obtain feature parameter sets of a plurality of filters corresponding to wavelengths that are not identical in a filter unit set

S1802

Introduce the feature parameter sets corresponding to all the filters and a preset parameter set into a preset feature vector conversion model, to obtain a plurality of feature vectors based on different detection targets

S1803

Introduce the plurality of feature vectors into a detection model corresponding to an application scenario type associated with the multispectral image sensor, and calculate a corresponding detection accuracy

S1804

Choose a feature parameter set of the filter unit set corresponding to the highest detection accuracy according to detection accuracies corresponding to all candidate manufacturing manners, and a candidate manufacturing manner of the multispectral image sensor corresponding to the feature parameter set as an initial manufacturing manner of the multispectral image sensor ciated with the image sensor, and calculating a corresponding detection accuracy; and selecting a feature parameter set of a filter unit set corresponding to a highest detection accuracy corresponding to the candidate manufacturing methods, and using a candidate manufacturing method corresponding to the selected feature parameter set as an initial manufacturing method of the image sensor.

20 Claims, 14 Drawing Sheets

(51) Int. Cl.

| | |
|---|---|
| *G06V 10/143* | (2022.01) |
| *G06V 10/44* | (2022.01) |
| *G06V 10/60* | (2022.01) |
| *G06V 40/16* | (2022.01) |
| *G06V 40/40* | (2022.01) |

(52) U.S. Cl.
CPC .............. *G06V 10/60* (2022.01); *G06V 40/40* (2022.01); *G06T 2207/10036* (2013.01)

(58) Field of Classification Search
CPC .... G06V 40/40; G06V 10/141; G06V 40/172; G06V 40/45; G01J 3/2823; G01J 3/0205; G01J 3/28; G01J 2003/2826
See application file for complete search history.

(56) References Cited

U.S. PATENT DOCUMENTS

| | | | | |
|---|---|---|---|---|
| 2020/0304732 | A1 | 9/2020 | Finlayson et al. | |
| 2021/0082094 | A1* | 3/2021 | McCall | H04N 23/56 |
| 2024/0187737 | A1* | 6/2024 | Saxe | G02B 5/201 |
| 2025/0203180 | A1* | 6/2025 | Yavin | G03B 37/02 |

FOREIGN PATENT DOCUMENTS

| | | |
|---|---|---|
| CN | 214481355 U | 9/2020 |
| CN | 113418864 A | 9/2021 |
| CN | 113566966 A | 10/2021 |

OTHER PUBLICATIONS

PCT International Search Report and the Written Opinion mailed May 27, 2022, issued in related International Application No. PCT/CN2022/080523, with partial English translation (11 pages).

\* cited by examiner 101
102
103

102

Filter unit set

1031

1032

Filter unit set

Pixel unit

Filter unit set

Pixel unit

| Serial number | Information sampling rate | Distortion distance | Sum of IR distances | IR distance fluctuation |
|---|---|---|---|---|
| 1 | 16.484 | 21.8809 | 4.828 | 0.2391 |
| 2 | 16.484 | 27.2039 | 5.651 | 0.5827 |
| 3 | 16.484 | 20.1338 | 5.242 | 0.2071 |
| 4 | 16.484 | 25.0432 | 4.828 | 0.2391 |
| 5 | 16.484 | 11.9814 | 6.650 | 0.5608 |
| 6 | 17.070 | 19.3863 | 5.414 | 0.4731 |
| 7 | 16.484 | 9.1930 | 4.828 | 0.2391 |
| 8 | 17.070 | 13.7285 | 4.828 | 0.2391 |
| 9 | 17.070 | 18.4760 | 4.414 | 0.2071 |
| 10 | 17.656 | 12.3153 | 4.828 | 0.2391 |
| 11 | 17.070 | 14.0603 | 4.414 | 0.2071 |
| 12 | 17.656 | 17.2234 | 4.414 | 0.2071 |
| 13 | 17.656 | 10.9872 | 4.828 | 0.2391 |
| 14 | 17.656 | 15.8902 | 5.650 | 0.5827 |
| 15 | 17.656 | 22.6165 | 4.828 | 0.2391 |
| 16 | 17.070 | 8.8191 | 5.242 | 0.2071 |
| 17 | 16.484 | 5.6569 | 5.656 | 0 |
| 18 | 17.656 | 23.2933 | 4.000 | 0 |

FIG. 15(b)

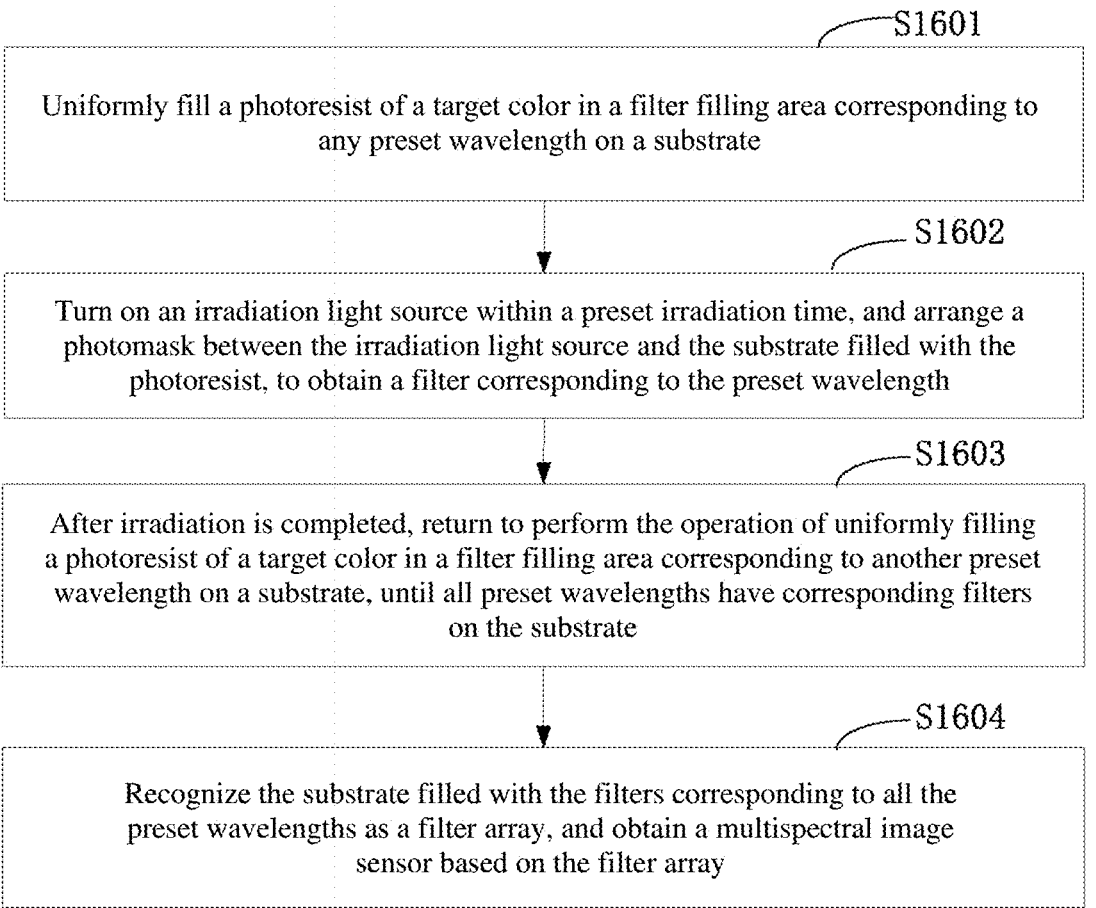

S1601

Uniformly fill a photoresist of a target color in a filter filling area corresponding to any preset wavelength on a substrate

S1602

Turn on an irradiation light source within a preset irradiation time, and arrange a photomask between the irradiation light source and the substrate filled with the photoresist, to obtain a filter corresponding to the preset wavelength

S1603

After irradiation is completed, return to perform the operation of uniformly filling a photoresist of a target color in a filter filling area corresponding to another preset wavelength on a substrate, until all preset wavelengths have corresponding filters on the substrate

S1604

Recognize the substrate filled with the filters corresponding to all the preset wavelengths as a filter array, and obtain a multispectral image sensor based on the filter array

FIG. 16

Substrate

Filters corresponding to different preset wavelengths

Open a pad

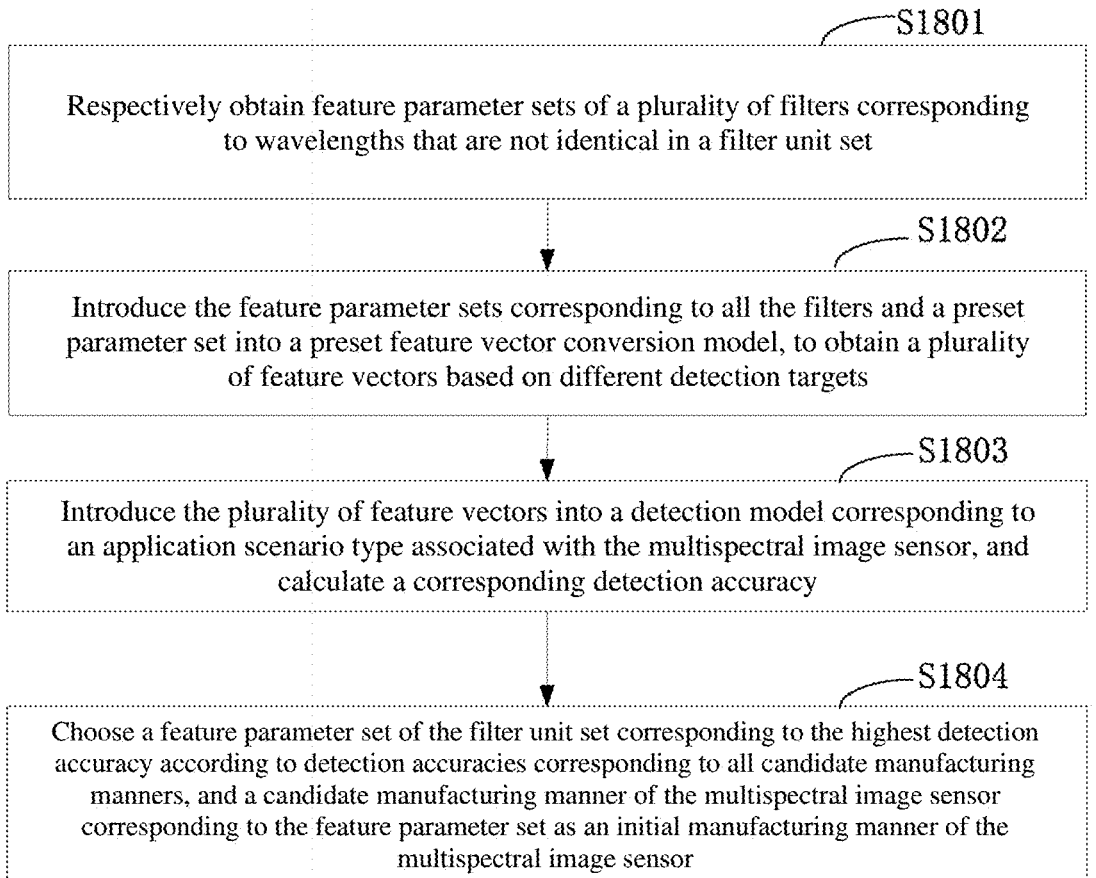

S1801

Respectively obtain feature parameter sets of a plurality of filters corresponding to wavelengths that are not identical in a filter unit set

S1802

Introduce the feature parameter sets corresponding to all the filters and a preset parameter set into a preset feature vector conversion model, to obtain a plurality of feature vectors based on different detection targets

S1803

Introduce the plurality of feature vectors into a detection model corresponding to an application scenario type associated with the multispectral image sensor, and calculate a corresponding detection accuracy

S1804

Choose a feature parameter set of the filter unit set corresponding to the highest detection accuracy according to detection accuracies corresponding to all candidate manufacturing manners, and a candidate manufacturing manner of the multispectral image sensor corresponding to the feature parameter set as an initial manufacturing manner of the multispectral image sensor

FIG. 18

METHOD FOR MANUFACTURING MULTISPECTRAL IMAGE SENSOR, AND DEVICE THEREOF

CROSS-REFERENCE TO RELATED APPLICATIONS

This application is a continuation application of International Patent Application No. PCT/CN2022/080523 filed with the China National Intellectual Property Administration (CNIPA) on Mar. 13, 2022, which is based on and claims priority to and benefits of Chinese Patent Application No. 202110628920.8, filed on Jun. 3, 2021. The entire content of all of the above-referenced applications is incorporated herein by reference.

TECHNICAL FIELD

This application belongs to the field of sensor technologies, and in particular, to a manufacturing method of a multispectral image sensor and a device.

BACKGROUND

Spectral imaging is one of the main existing imaging technologies. Data based on spectral imaging includes both image information and spectral information. The spectral information can reflect the spectral intensity of each pixel at each wave band during the shooting of an image. A shooting object in the image may be qualitatively or even quantitatively analyzed by using the spectral information. Therefore, spectral imaging is applicable to scenarios with various different demands. Therefore, how to manufacture a multispectral image sensor with a relatively high recognition accuracy becomes an urgent problem to be resolved.

In existing manufacturing technologies of multispectral image sensors, multispectral image sensors are generated where the filters of the multispectral image sensors may be switched. A multispectral image is acquired by switching filters corresponding to different preset wavelengths on a photosensitive chip. However, when a multispectral image sensor generated in the foregoing manner obtains a multispectral image, because different spectrums are acquired at different moments, the real-time performance is relatively low, and different spectrums are not acquired simultaneously, affecting the precision and efficiency of imaging.

SUMMARY

In view of this, embodiments of this application provide a manufacturing method of a multispectral image sensor and a device, to resolve the problem in existing manufacturing technologies of multispectral image sensors as described above.

A first aspect of the embodiments of this application provides a method for manufacturing an image sensor, including:

obtaining feature parameter sets of a plurality of filters corresponding to different wavelengths in a filter unit set, where the image sensor includes at least one filter unit set, the image sensor is manufactured in one of candidate manufacturing methods, and the feature parameter sets correspond to the candidate manufacturing methods;

inputting the feature parameter sets corresponding to the plurality of filters and a preset parameter set into a feature vector conversion model, to obtain a plurality of feature vectors based on detection targets;

inputting the plurality of feature vectors into a detection model corresponding to an application scenario type associated with the image sensor, and calculating a corresponding detection accuracy; and selecting a feature parameter set of a filter unit set corresponding to a highest detection accuracy among detection accuracies corresponding to the candidate manufacturing methods, and using a candidate manufacturing method of the image sensor corresponding to the selected feature parameter set as an initial manufacturing method of the image sensor.

A second aspect of the embodiments of this application provides a manufacturing apparatus of a multispectral image sensor, including:

a feature parameter set obtaining unit, configured to obtain feature parameter sets of a plurality of filters corresponding to different wavelengths in a filter unit set, where the image sensor includes at least one filter unit set, the image sensor is manufactured in one of candidate manufacturing methods, and the feature parameter sets correspond to the candidate manufacturing methods;

a feature vector obtaining unit, configured to input the feature parameter sets corresponding to the plurality of filters and a preset parameter set into a feature vector conversion model, to obtain a plurality of feature vectors based on detection targets;

a detection accuracy calculation unit, configured to input the plurality of feature vectors into a detection model corresponding to an application scenario type associated with the image sensor, and calculate a corresponding detection accuracy; and an initial manufacturing manner determination unit, configured to select a feature parameter set of a filter unit set corresponding to a highest detection accuracy among detection accuracies corresponding to the candidate manufacturing methods, and use a candidate manufacturing method of the image sensor corresponding to the selected feature parameter set as an initial manufacturing method of the image sensor.

A third aspect of the embodiments of this application provides a terminal device, including a memory, a processor, and a computer program stored in the memory and executable on the processor, where the processor, when executing the computer program, performs the operations in the first aspect.

A fourth aspect of the embodiments of this application provides a non-transitory computer-readable storage medium, where the non-transitory computer-readable storage medium stores a computer program, and the computer program, when executed by a processor, performs the operations in the first aspect.

The implementation of the manufacturing method of a multispectral image sensor and the device thereof provided in the embodiments of this application has the following beneficial effects.

In the embodiments of this application, feature parameter sets of a plurality of filters corresponding to different preset wavelengths in a filter unit set obtained based on any candidate manufacturing method are obtained. The feature parameter sets corresponding to all the filters and a preset parameter set are inputted into a preset feature vector conversion model. A feature vector corresponding to the filter unit set is determined, thereby obtaining a detection accuracy corresponding to the candidate manufacturing method, to determine whether a multispectral image sensor manufactured in the candidate manufacturing method adapt to an application scenario, thereby further determining a candidate manufacturing method with the highest adaptability. The candidate manufacturing method is used as an initial manufacturing method of the multispectral image sensor. A multispectral image sensor with a filter unit set including a plurality of filters corresponding to preset wavelengths that are not identical is manufactured, to implement simultaneous acquisition of different spectrums during imaging, thereby improving the precision, efficiency, and accuracy of imaging.

BRIEF DESCRIPTION OF THE DRAWINGS

To describe the technical solutions in the embodiments of this application more clearly, the accompanying drawings required in the description of the embodiments or existing technologies are briefly described below. Apparently, the accompanying drawings in the following description show merely some embodiments of this application, and a person of ordinary skill in the art may still derive other drawings from these accompanying drawings without creative efforts.

FIG. 12 is a schematic diagram of arrangement positions of different filters of RGB channels in a filter array according to an embodiment of this application;

FIG. 15(a) shows the three parameters in all candidate manners according to this application.

FIG. 15(b) shows a parameter table of the three parameters in all candidate manners according to this application.

FIG. 16 is a flowchart of a manufacturing method of a multispectral image sensor according to a first embodiment of this application.

FIG. 18 is a flowchart of a manufacturing method of a multispectral image sensor according to the first embodiment of this application.

DETAILED DESCRIPTION

Figures 1A, 1B:
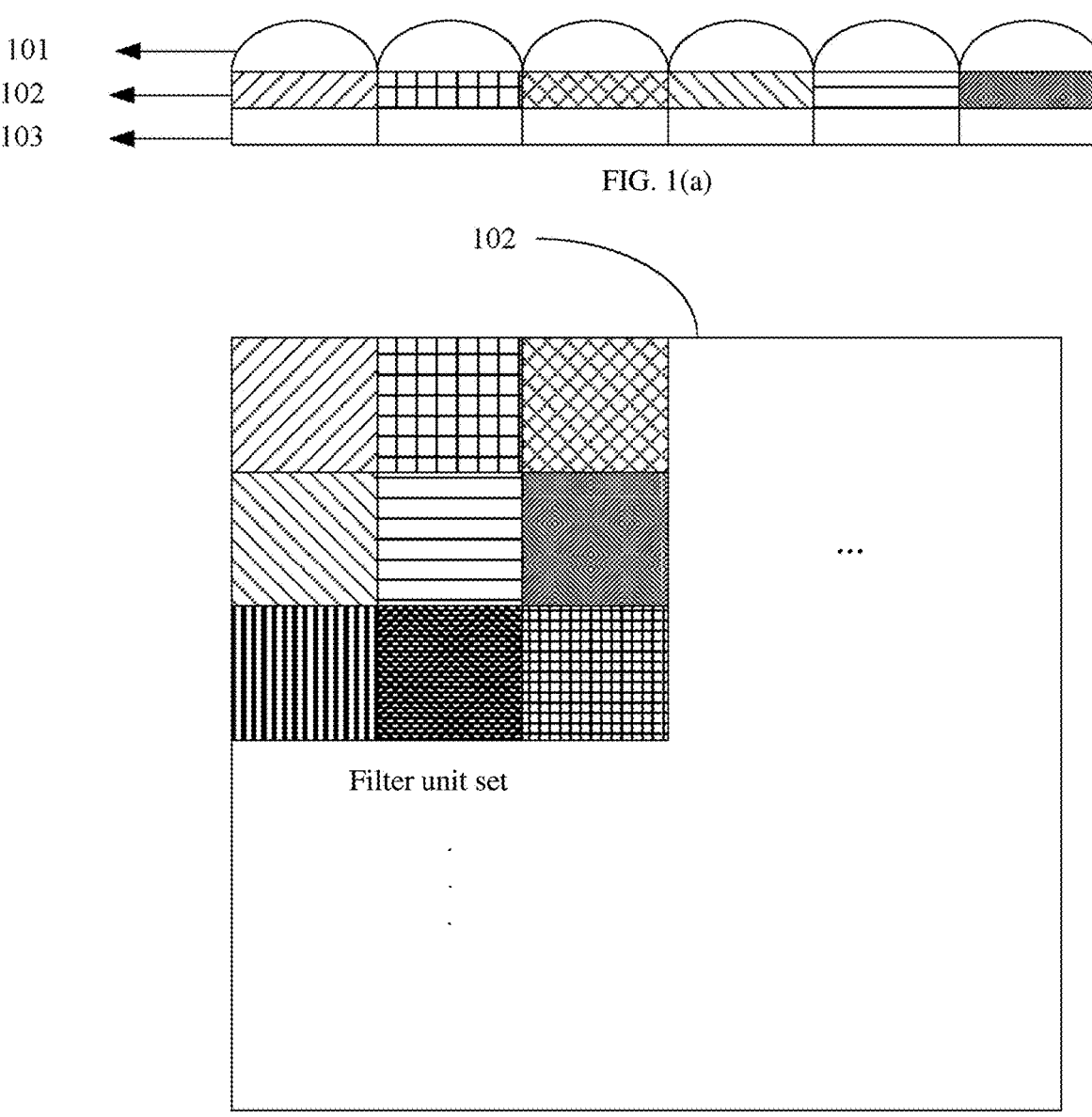
FIG. 1(a) is a schematic structural diagram of a cross-section view of a multispectral image sensor according to an embodiment of this application.
FIG. 1(b) is a schematic structural diagram of a bird's eye view of a multispectral image sensor according to an embodiment of this application.

To make the objectives, technical solutions, and advantages of this application clearer, this application is further described below in detail with reference to the accompanying drawings and embodiments. It should be understood that the specific embodiments described herein are only used for describing this application rather than limiting this application.

Data based on spectral imaging includes both image information and spectral information, and has a data type integrating an image and a spectrum. Data obtained through spectral imaging can reflect the spectral intensity of each pixel at each wave band during the shooting of an image. Qualitative and quantitative analysis, positioning analysis, and the like may be performed on an object by using spectral imaging technologies. The spectral imaging technologies may be categorized into three classes in an ascending order of the spectral resolution: multispectral imaging, high spectral imaging, and hyperspectral imaging technologies. The spectral imaging technologies have both the spectral discrimination capability and the image discrimination capability, and are applicable to the identification of geological minerals and vegetation ecology, the reconnaissance of military targets, and other scenarios.

At present, a spectral imaging device may mainly be implemented by using several solutions as follows. The first solution is a filter switching method. A multispectral image sensor based on the foregoing method includes a plurality of filters. The plurality of filters are generally located between an object under test and a lens. When image acquisition is required, the sensor switches to a specific filter based on a preset switching sequence. Only a single image with specific filtering characteristics can be outputted through a single exposure. A spectral image with multiple channels, that is, a multispectral image, is obtained by continuously switching the filters to perform a plurality of exposures. In the second solution, a push-broom method is used in the implementation of a multispectral image sensor. Only the multispectral information of the object under test in one pixel width (that is, corresponding to one column of pixels) can be outputted through a single exposure. To obtain a spatially complete two-dimensional image of the object under test, exposures need to be performed in a push-broom manner to obtain the multispectral information corresponding to a plurality of columns of pixels, to eventually synthesize a spectral image with multiple channels.

However, for the multispectral images generated in both a filter switching manner and a push-broom manner, there is a real-time performance problem. For example, for a multispectral image obtained in the filter switching manner, different spectrums have inconsistent acquisition moments, that is, there is a real-time deviation in the time domain. For a multispectral image obtained in a push-broom manner, only the multispectral information of one column of pixels can be obtained each time, and different columns have inconsistent obtaining moments, that is, there is a real-time performance deviation in the spatial domain, causing great impact on the imaging precision and efficiency of the multispectral images.

Therefore, to resolve the problem in existing technologies, this application provides a multispectral image sensor and a manufacturing method of a multispectral image sensor, to simultaneously obtain the overall multispectral information of an object under test, thereby satisfying the real-time performance of a multispectral image in the spatial domain and the time domain, and improving the imaging precision and efficiency of multispectral images.

Embodiment 1

FIG. 1(a) and FIG. 1(b) are schematic structural diagrams of a multispectral image sensor according to an embodiment of this application. For ease of description, only the part related to the embodiments of this application is shown. Details are as follows.

Referring to FIG. 1(a), a cross-section of a multispectral image sensor is provided in the embodiments of this application. The multispectral image sensor includes a microlens array 101, a filter array 102, and a photosensitive chip 103 that are sequentially arranged along a direction of incident light.

The photosensitive chip 103 includes a plurality of pixel units.

Referring to FIG. 1(b), a top view or a bird's eye view of the filter array 102 is provided. The filter array 102 includes at least one filter unit set. Each filter unit set includes a plurality of filters corresponding to preset wavelengths that are not identical, that is, different wavelengths. Each filter is configured to allow the passage of light with a preset wavelength corresponding to the filter in the incident light.

The microlens array 101 includes at least one microlens unit. The microlens unit is configured to converge the incident light, and make the converged incident light pass through the filter array to focus on the photosensitive chip.

In this embodiment, the photosensitive chip 103 included in the multispectral image sensor may convert the acquired optical image information into an electrical signal, to obtain and store the image data including multiple spectrums.

In an embodiment, the photosensitive chip 103 may be a complementary metal-oxide-semiconductor (Complementary Metal-Oxide-Semiconductor, CMOS) sensor chip or may be a charge-coupled device (Charge-coupled Device, CCD) chip. Certainly, another chip that may convert an optical signal into an electrical signal may be used as the photosensitive chip 103 in this embodiment.

Figure 2:
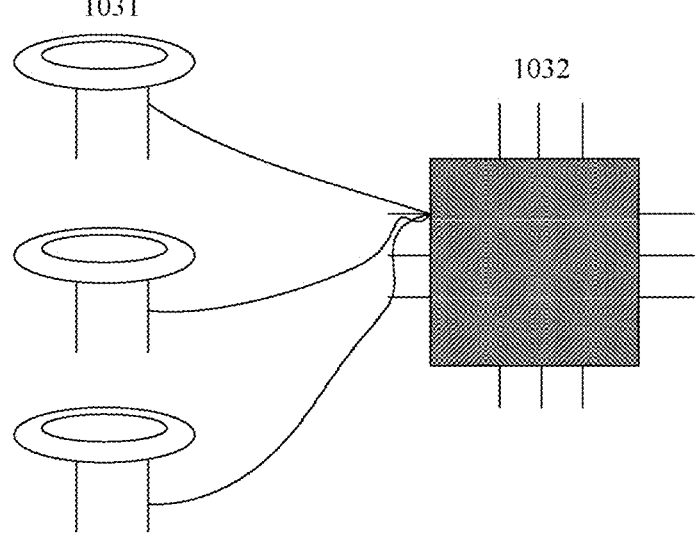
FIG. 2 is a schematic structural diagram of a photosensitive chip 103 according to another embodiment of this application.

Further, FIG. 2 is a schematic structural diagram of a photosensitive chip 103 according to another embodiment of this application. Referring to FIG. 2, the photosensitive chip 103 in this embodiment may include a photodiode 1031 and a signal processing module 1032, which may also be referred to as a circuit part. The photodiode 1031 is electrically connected to the signal processing module 1032. One photosensitive chip may include a plurality of photodiodes 1031. Each pixel unit includes at least one photodiode 1031. The photodiode 1031 may convert an acquired optical signal into an electrical signal based on the photoelectric effect, and transmit the electrical signal to the signal processing module (that is, the circuit part). The signal processing module reads the electrical signal generated by the photodiode, and processes the electrical signal to obtain a corresponding light sensing result. In the multispectral image sensor, the light sensing result may also be referred to as a multispectral image. Certainly, the circuit part may further transmit the electrical signal to a connected device, for example, transmit the acquired multispectral image to a processor. In an embodiment, a layout manner of the photosensitive chip 103 may be of a front illuminated type, a back-illuminated type, a stacked type, or the like. An exposure manner of the photosensitive chip 103 may be global exposure, rolling exposure, or the like. The exposure manner and the layout manner are not limited herein.

In this embodiment, the photosensitive chip 103 includes a plurality of pixel units. Each pixel unit may acquire corresponding multispectral data. The multispectral data corresponding to the plurality of pixel units are synthesized to obtain the multispectral image data. It needs to be noted that the pixel units included in one photosensitive chip 103 may be determined according to the resolution and image size of acquisition of the pixel units, and may be correspondingly adjusted according to a use scenario. A quantity of the pixel units is not limited herein.

Figure 3:
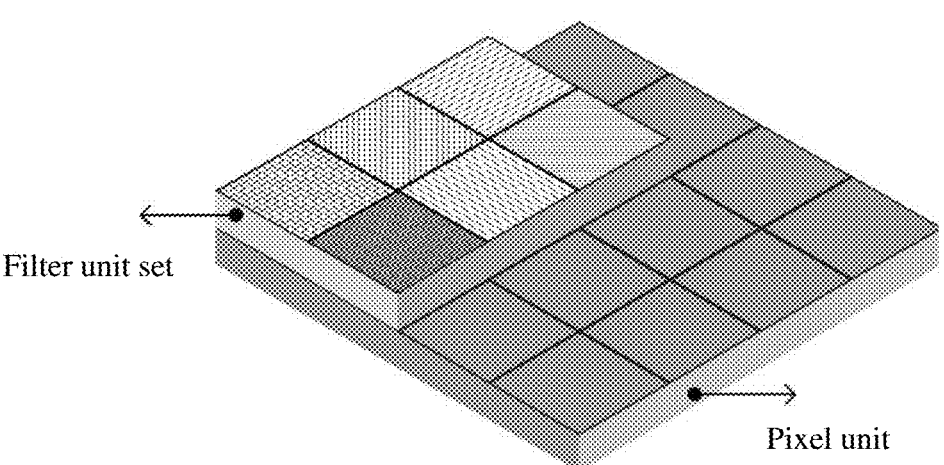
FIG. 3 is a schematic structural diagram between a pixel unit and a filter according to an embodiment of this application.

In an embodiment, FIG. 3 is a schematic structural diagram between a pixel unit and a filter according to an embodiment of this application. Referring to FIG. 3, one filter covers each pixel unit. In the case, an optical signal obtained by one filter through filtering is irradiated to a corresponding pixel unit. The pixel unit is configured to convert the optical signal into an electrical signal, and a multispectral image is generated based on the electrical signals of all the pixel units.

Figure 4:
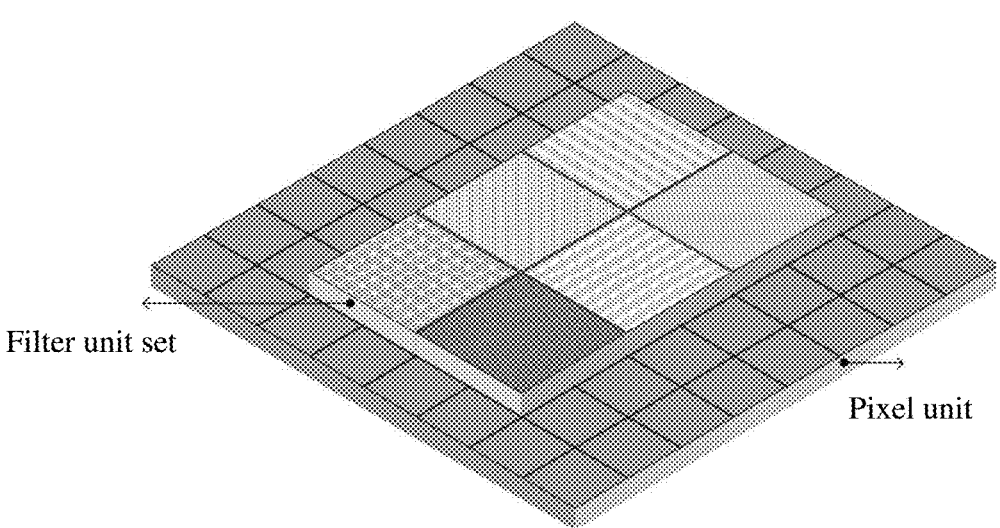
FIG. 4 is a schematic structural diagram between a pixel unit and a filter according to another embodiment of this application.

In an embodiment, FIG. 4 is a schematic structural diagram between a pixel unit and a filter according to another embodiment of this application. Referring to FIG. 4, each filter covers a plurality of pixel units. In this case, one filter covers a plurality of pixel units, so that each pixel unit may be configured to record a spectral signal of the same filter, and convert the spectral signal into a corresponding electrical signal. The foregoing structure can improve the accuracy of acquisition in a scenario with a relatively low transmittance. Although the image resolution is reduced to a certain degree, the acquisition precision of each optical signal is improved.

In this embodiment, the multispectral image sensor includes a microlens array 101. The microlens array includes at least one microlens unit, or certainly may include two or more microlens units. A specific quantity of microlens units may be correspondingly configured according to an actual scenario or a sensor requirement. The quantity of microlens units is not limited herein. The microlens array is configured to converge the incident light, and make the converged incident light pass through the filter array to focus on the photosensitive chip. The incident light may be light that is emitted by a preset light source and is reflected by an object under test or may be the light generated by the object under test.

In an embodiment, each microlens unit in the microlens array 101 corresponds to one filter unit set in a filter matrix. That is, there is a one-to-one correspondence between the microlens units and the filter unit sets. Each microlens unit is configured to converge the incident light into an area corresponding to the filter unit set, and make the incident light irradiate the photosensitive chip 103 through the filter unit set. Certainly, one microlens unit may further correspond to two or more filter unit sets. A specific correspondence may be determined according to an actual case.

In this embodiment, the multispectral image sensor includes a filter array 102. The filter array 102 includes at least one filter unit set. One filter unit set includes a plurality of filters. Different filters may correspond to different preset wavelengths that are not identical. That is, one filter unit set may have two or more filters corresponding to the same preset wavelength and have two or more filters corresponding to different preset wavelengths, and optical signals corresponding to different spectrums may be acquired. One filter unit set includes filters having different preset wavelengths, and different filters can only allow the passage of the light with specific wavelengths. That is, the light with a preset wavelength is obtained from the incident light through filtering. Therefore, optical signals with multiple spectrums may be obtained by using one filter unit set. After the incident light passes the through filter unit set, the photosensitive chip may acquire the optical signals with multiple spectrums, and converts the optical signals into corresponding electrical signals, thereby generating the multispectral image data.

In this embodiment, the filter array 102 of the multispectral image sensor includes a plurality of filters corresponding to different preset wavelengths. Therefore, when incident light passes through the filter array 102 to irradiate the photosensitive chip 103, the photosensitive chip may filter the light with the filter in the ranges of visible light and near infrared light (for example, light with a wave band ranging from 300 nm and 1100 nm) to obtain a multispectral image. The bandwidth of the multispectral image may range from 50 nm to 700 nm, or certainly may be greater than or less than the bandwidth ranges. An acquired multispectral image or a reconstructed multispectral image using the multispectral image sensor provided in this embodiment may be used for qualitatively analyzing components of a shooting object, for example, recognizing components of a substance, or obtaining a more precise environmental color temperature and performing color recovery on the shooting object based on the environmental color temperature, or may perform more accurate liveness detection, facial recognition, and the like. That is, the image data based on multispectral acquisition may be applied to various different use scenarios.

In an embodiment, one filter unit set may include four or more filters, for example, four filters, nine filters or sixteen filters. A specific quantity of filters is determined according to a channel quantity of the multispectral image sensor. If the filter unit set includes nine filters, the filter unit set may be a 3*3 filter matrix.

Figure 5:
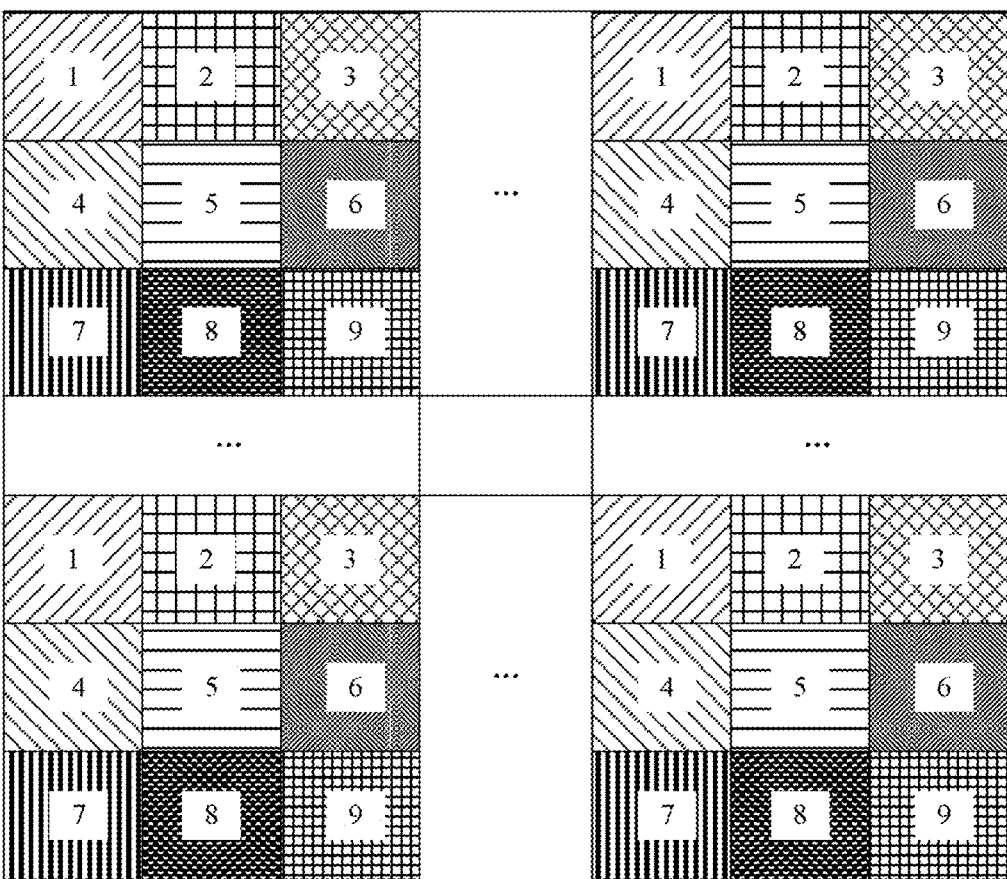
FIG. 5 is a schematic diagram of a filter array according to an embodiment of this application.

In an embodiment, for example, different filters in the same filter unit set are arranged on a two-dimensional plane in a preset arrangement. When a filter array includes two or more filter unit sets, because filters corresponding to different preset wavelengths in each filter unit set are arranged in the same arrangement, for the entire filter array, the filters corresponding to different preset wavelengths are periodically arranged in a two-dimensional plane in a preset arrangement order. For example, FIG. 5 is a schematic diagram of a filter array according to an embodiment of this application. The filter array includes four filter unit sets. Each filter unit set includes nine filters, which are filters 1 to 9 corresponding to different wavelengths. The filters in each filter unit set are arranged in the same manner, thereby forming a structure with a periodic arrangement in a preset arrangement order.

Figures 6, 7, 8, 9:
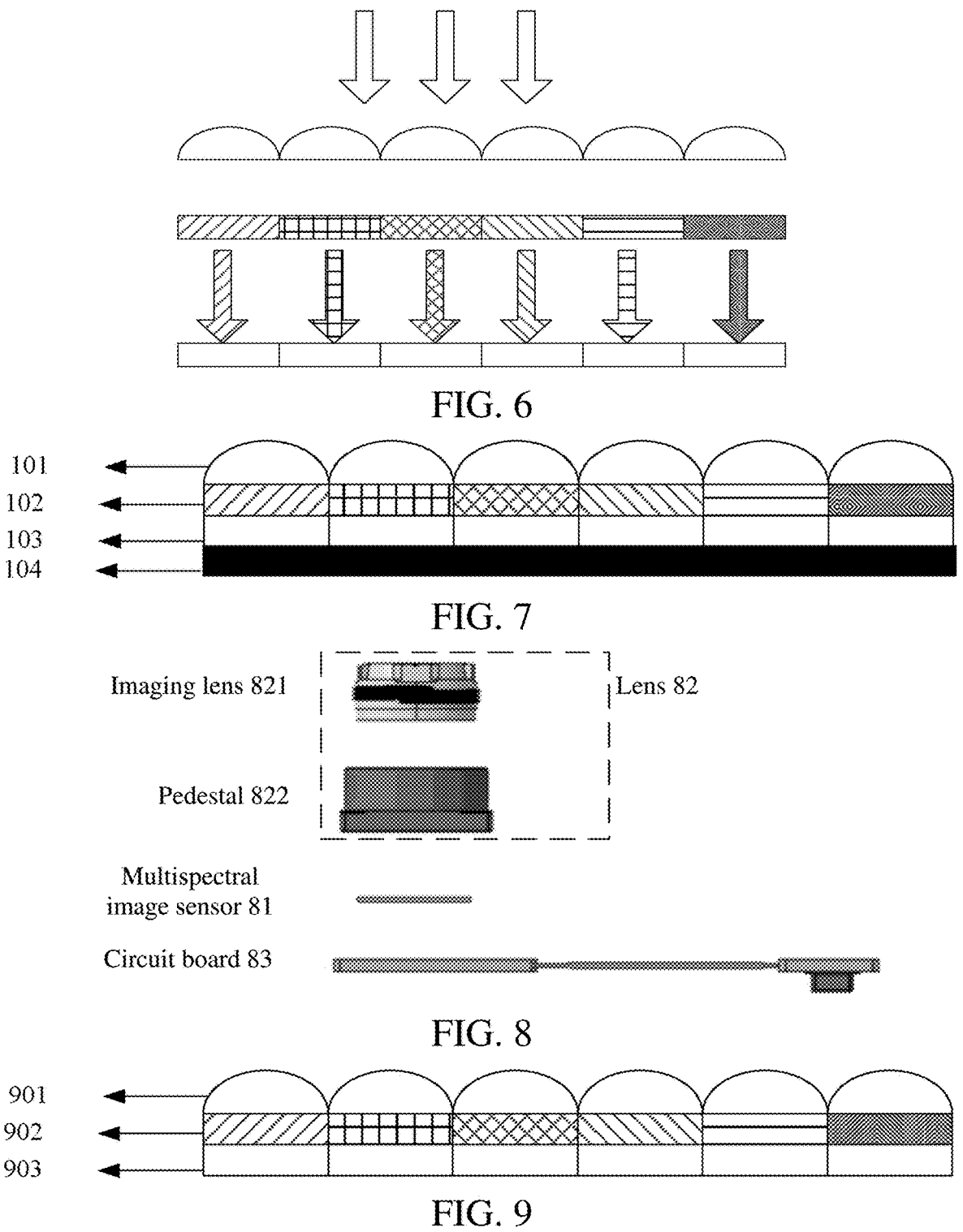
FIG. 6 is a schematic diagram of incident light passing through a filter unit set according to an embodiment of this application.
FIG. 7 is a schematic structural diagram of a multispectral image sensor according to another embodiment of this application.
FIG. 8 is a schematic structural diagram of an imaging module according to an embodiment of this application.
FIG. 9 is a schematic structural diagram of a multispectral image sensor according to another embodiment of this application.

In an embodiment, for example, the filter unit set is a broadband filter matrix. Similarly, the broadband filter matrix includes a plurality of filters corresponding to different preset wavelengths. Compared with an existing multispectral image sensor, a filter unit set in the multispectral image sensor provided in the embodiments of this application may be considered as one broadband filter matrix, that is, a broadband filter formed by a plurality of filters corresponding to different preset wavelengths. That is, a filter unit set formed by a plurality of filters may be considered as one broadband filter. Therefore, a wave band formed by preset wavelengths corresponding to all filters included in the filter unit set may be in a relatively wide range, for example, from 300 nm to 1100 nm, or from 350 nm to 1000 nm. That is, a spectral range may be wave bands of visible light and near infrared light. A spectral transmittance curve of the broadband filter matrix may be similar to a spectral transmittance curve of a Bayer filter. The full width at half maximum (the full width at half maximum is a transmission peak width at a half of a peak height) of a transmission spectrum ranges from 50 nm to 700 nm. Different spectral transmission characteristics correspond to different colors. That is, after white light enters a filter corresponding to a preset wavelength in the broadband filter matrix, only the light with the corresponding wavelength is allowed to pass through, and the light with all the remaining wave bands is blocked. For example, FIG. 6 is a schematic diagram of incident light passing through a filter unit set according to an embodiment of this application. Referring to FIG. 6, different filters only allow the light with corresponding wave bands to pass through, and the light with other wave bands is blocked. Because one filter unit set includes filters corresponding to a plurality of different wave bands, wave bands obtained through filtering in the entire filter unit set are relatively wide, and the filter unit set may be considered as one broadband filter, that is, a broadband filter matrix.

In an embodiment, the broadband filter matrix includes a filter that may allow passage of light in a near infrared wave band, so that a spectral range in which light is allowed to pass through of the entire broadband filter matrix may be expanded. In most existing color camera modules, a filter that filters out light in a near infrared wave band (that is, does not allow the passage of light in the near infrared wave band), that is, IR-cut, is usually added to the color camera modules (between a lens and a photosensitive chip), to completely cut off light in the near infrared spectrum (650 nm to 1100 nm), to implement better color recovery. However, to expand a spectrum utilization range and obtain more spectral data to adapt to demands in different application scenarios, the multispectral image sensor provided in this application also utilizes a near infrared spectrum (when the spectrum utilization range is wider, spectral information is richer). Therefore, the multispectral image sensor may select not to use an infrared cut-off filter. That is, a filter that allows the passage of the near infrared light may be added to the broadband filter matrix, so that while color recovery can be similarly ensured, more spectral information is introduced. The filter that allows the passage of the near infrared light and a filter of another preset wave band have close response curves in the near infrared wave band. A spectral curve corresponding to each preset wavelength may be recovered by subtracting spectral information acquired by a black filter from spectral information acquired by filters corresponding to all other preset wave bands except the near infrared wave band. The filter that only responds to near infrared light is used as an IR cut filter.

Further, in another embodiment of this application, the multispectral image sensor further includes a base 104. The photosensitive chip 103, the filter array 102, and the microlens array 101 are sequentially arranged on the base. For example, FIG. 7 is a schematic structural diagram of a multispectral image sensor according to another embodiment of this application.

Referring to FIG. 7, the multispectral image sensor includes the base 104. The photosensitive chip 103 is arranged above the base 104. The filter array 102 and the microlens array 101 are located above the photosensitive chip 103, so that the incident light may pass through the microlens array 101 to converge on the filter array 102, and the incident light is filtered by the filter array 102, to enable the light with multiple spectrums to irradiate the photosensitive chip 103, thereby acquiring the image data with multiple spectrums.

Further, in another embodiment of this application, this application further provides an imaging module based on the foregoing multispectral image sensor. The imaging module includes the multispectral image sensor provided in any foregoing embodiment. In addition to the foregoing multispectral image sensor, the imaging module further includes a lens and a circuit board. For example, FIG. 8 is a schematic structural diagram of an imaging module according to an embodiment of this application. Referring to FIG. 8, the imaging module includes a multispectral image sensor 81, a lens 82, and a circuit board 83. The multispectral image sensor 81 is arranged on the circuit board 83. The lens 82 is arranged above the multispectral image sensor 81 and is fixed on the circuit board 83, so that the incident light may pass through the lens to irradiate the multispectral image sensor 81. It needs to be noted that the imaging module may include one multispectral image sensor 81, or two or more multispectral image sensors 83 may be arranged. If the imaging module includes a plurality of multispectral image sensors 81, the lens 82 may be arranged above the plurality of multispectral image sensors 81. That is, the plurality of multispectral image sensors 81 correspond to one lens 82. Certainly, one independent lens 82 may be configured for every multispectral image sensor 81. A specific configuration may be configured according to an actual use scenario. This is not limited herein.

In an embodiment, the lens 82 in the imaging module includes an imaging lens 821 and a pedestal 822. The imaging lens 821 is arranged on the pedestal 822. The multispectral image sensor 81 connected to the pedestal 822 is arranged on the circuit board 83. That is, after the actual installation, the pedestal 822 covers the multispectral image sensor 81, that is, covers the entire multispectral image sensor 81 and is arranged on the circuit board 83.

In the embodiments of this application, the multispectral image sensor includes a filter array, the filter array includes at least one filter unit set, and each filter unit set includes filters corresponding to different preset wavelengths, so that the simultaneous acquisition of optical signals in a plurality of different wave bands and the generation of multispectral image data can be implemented, thereby ensuring the real-time performance of the acquisition of different channels in the multispectral image data, and providing the precision and efficiency of imaging.

Embodiment 2

FIG. 9 is a schematic structural diagram of a multispectral image sensor according to another embodiment of this application. For ease of description, only the part related to the embodiments of this application is shown. Details are as follows.

The multispectral image sensor includes a microlens array 901, a filter array 902, and a photosensitive chip 903 that are sequentially arranged along a direction of incident light.

The photosensitive chip 903 includes a plurality of pixel units.

The filter array 902 includes at least one filter unit set. Each filter unit set includes a plurality of filters corresponding to different preset wavelengths that are not identical. Each filter is configured to allow the passage of light with a preset wavelength corresponding to the filter in the incident light. The filters in each filter unit set are arranged in a target manner. The target manner is an arrangement corresponding to optimal image acquisition indicators corresponding to the filter unit set.

The microlens array 901 includes at least one microlens unit. The microlens unit is configured to converge the incident light, and make the converged incident light pass through the filter array to focus on the photosensitive chip.

In this embodiment, the photosensitive chip 903 and the microlens array 901 are respectively the same as the photosensitive chip 103 and the microlens array 101 in Embodiment 1, and are both configured to convert an optical signal into an electrical signal and configured to converge light. For detailed description, reference may be made to the related description in Embodiment 1. Details are not described herein again.

In this embodiment, the filter array 902 is similar to the filter array 102 in the previous embodiment, both including at least one filter unit set, and the filter unit set includes filters corresponding to different preset wavelengths. Different from the filter array 102 in Embodiment 1, the filters in the filter unit set of the filter array 902 in this embodiment are arranged in a preset target manner, and when the filters are arranged in the foregoing manner, image acquisition indicators corresponding to the filter unit set are optimal.

In an embodiment, before the target manner is determined, image acquisition indicators corresponding to candidate manners may be respectively determined. An optimal image acquisition indicator is determined based on the image acquisition indicators of all candidate manners. A candidate manner corresponding to the optimal image acquisition indicator is used as the target manner. In an embodiment, the image acquisition indicator includes a plurality of indicator dimensions. Different weight values may be configured for the different indicator dimensions according to different use scenarios. A weighting operation is performed according to indicator values corresponding to a candidate manner in the indicator dimensions and the configured weight value, so that an image acquisition indicator corresponding to the candidate manner can be calculated. If the value of the image acquisition indicator is larger, it indicates that the adaptability to a use scenario is higher, an imaging effect is better, and the recognition accuracy is higher. Based on this, a candidate manner corresponding to an image acquisition indicator with the largest value may be chosen as the target manner.

In an embodiment, the filter unit set includes an m*n filter matrix. That is, in one filter unit set, the filters are arranged in a manner of m rows and n columns, to form one m*n filter matrix. For example, the filters in the filter matrix may be square filters or may be rectangular filters. m and n are both positive integers greater than 1. For example, m may be 2, 3, 4, or the like. Correspondingly, n may also be 2, 3, 4, or the like. The values of m and n may be the same or may be different. Specific values of m and n are not limited herein.

For example, according to the colors of filters included in a filter unit set, the filter unit set (that is, the filter matrix) may be categorized into several types as follows, which are respectively: a GRBG filter, an RGGB filter, a BGGR filter, and a GBRG filter, where G represents a filter that allows the passage of green light, R represents a filter that allows the passage of red light, and B represents a filter that allows the passage of blue light.

Figure 10A:
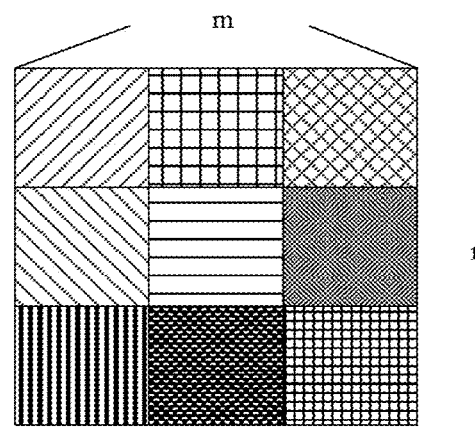
FIG. 10(a) is a schematic diagram of a filter matrix and a filter array according to an embodiment of this application.
Figure 10B:
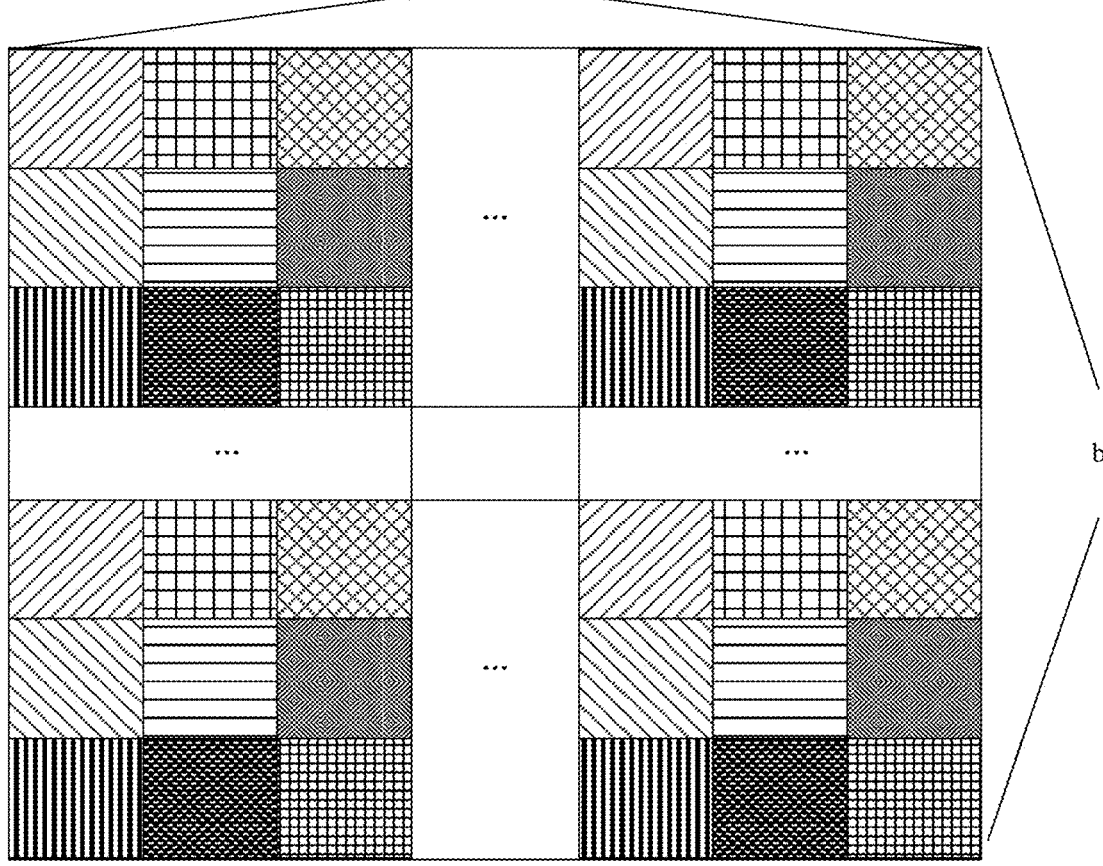
FIG. 10(b) is a schematic diagram of a filter matrix and a filter array according to an embodiment of this application.

A 3*3 filter matrix is used as an example for description. For example, FIG. 10(*a*) and FIG. 10(*b*) are schematic diagrams of a filter matrix and a filter array according to an embodiment of this application. Referring to FIG. 10(*a*) and FIG. 10(*b*), the filter matrix includes nine filters. As shown in FIG. 10(*a*), the nine filters may be filters corresponding to different preset wavelengths, or certainly may be filters corresponding to fewer than 9 different preset wavelengths. In this case, one filter matrix includes two or more filters corresponding to repetitive preset wavelengths. Preferably, the filter matrix includes different filters corresponding to at least four different preset wavelengths. One filter matrix may include a plurality of filter unit sets, for example, include a*b filter unit sets (that is, a filter array). Therefore, the entire filter array is shown in FIG. 10(*b*). Each column of the filter array includes m*a filters, and each row includes n*b filters. If each filter is associated with one pixel unit, the resolution of the generated multispectral image sensor is (m*a)*(n*b). Similarly, if the filter matrix is a 4*4 filter matrix, the filter matrix may include filters corresponding to sixteen different preset wavelengths, or filters corresponding to fewer than sixteen preset wavelengths, for example, only includes filters corresponding to eight different preset wavelengths. That is, two repetitive filters corresponding to the same preset wavelength are required, to ensure a uniform spatial distribution.

A 3*3 filter matrix with a total of 9 different preset wavelengths (that is, allowing the passage of different specific colors) continues to be used as an example for description. The positions of the filters in the filter matrix are mainly determined based on several aspects as follows. 1) From the perspective of the entire filter array, the specific position of a single color in the 3*3 matrix is not required. Therefore, relative positions between different colors in one filter matrix (that is, the filter unit set) need to be considered. 2) It needs to be considered whether there is a specific requirement for the relative positions of colors in subsequent scenario applications. 3) The recovery effect of a color image (for example, an RGB image) is strongly correlated to the relative positions of colors. Therefore, if a scenario application does not have a specific requirement for the relative positions of colors, the demand of a color image recovery algorithm (which subsequently becomes an RGB recovery algorithm) is mainly considered in the design of the spatial arrangement of filters corresponding to different preset wavelengths in a filter array.

Figures 11A, 11B, 11C:
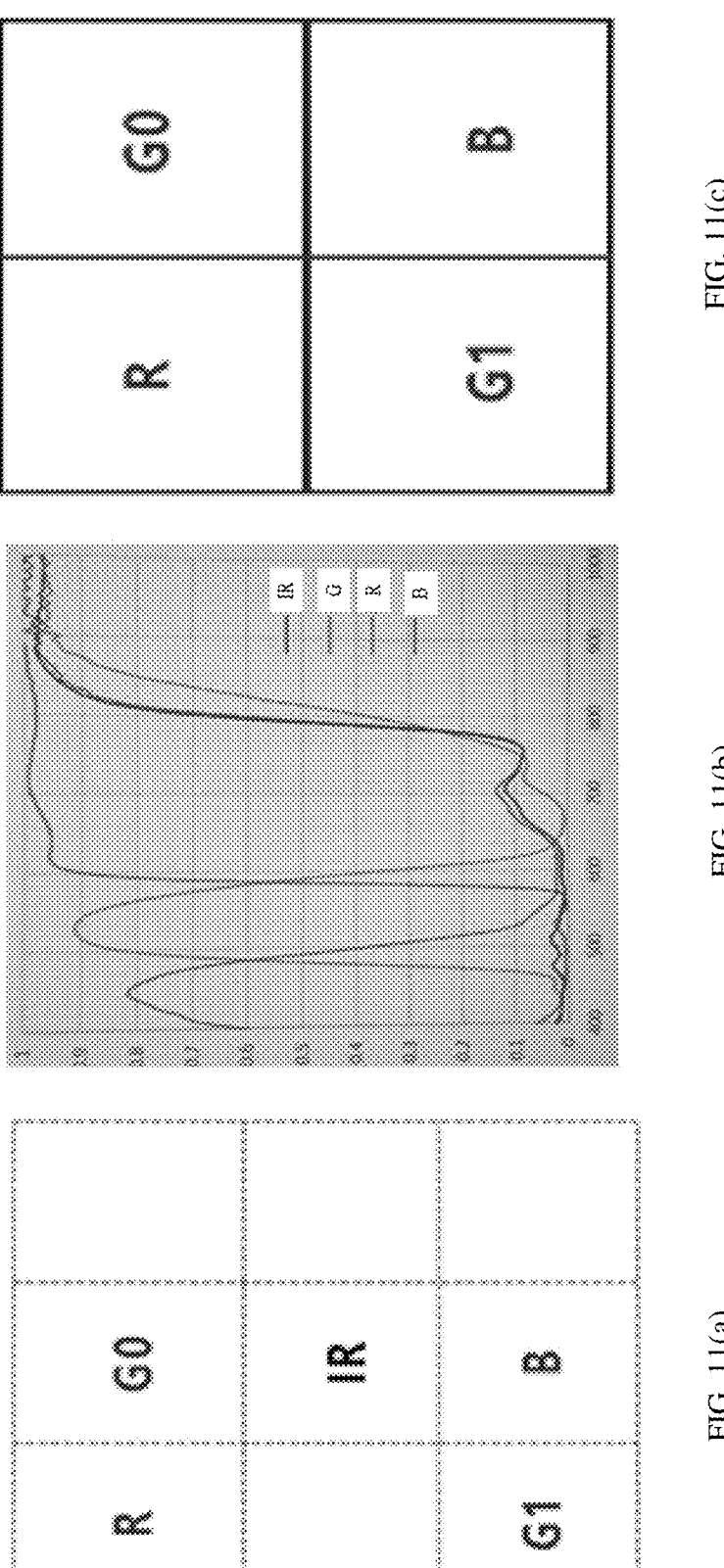
FIG. 11(a) is a schematic diagram of a filter matrix of an RGB recovery algorithm used in a multispectral image sensor according to an embodiment of this application.
FIG. 11(b) is a schematic diagram of transmittance curves of the filters of an RGB recovery algorithm used in a multispectral image sensor according to an embodiment of this application.
FIG. 11(c) is a schematic diagram of a processed filter matrix of filters of an RGB recovery algorithm used in a multispectral image sensor according to an embodiment of this application.

In this embodiment, FIG. 11(*a*)-FIG. 11(*c*) are schematic diagrams of an RGB recovery algorithm used in a multispectral image sensor according to an embodiment of this application. Referring to FIG. 11(*a*), a filter matrix in a filter array is an RGGB filter matrix. Therefore, the entire filter matrix includes two filters G1 and G0 that may allow the passage of green light, one filter R that may allow the passage of red light, and one filter B that may allow the passage of blue light, and in addition, further includes a filter IR that may allow the passage of near infrared light. Other wavelengths (that is, colors of light of which the passage may be allowed) that correspond to filters may be selected according to an actual requirement. The performing the RGB recovery algorithm may include the following three steps.

1) A grayscale value of an IR channel is subtracted from grayscale values of four channels R, G0, G1, and B respectively, that is, R=R−IR, G0=G0−IR, G1=G1−IR, and B=B−IR. The reason of performing the operation in this step is that the filters R, G, and B cannot completely cut off near infrared light, that is, they all have responses to near infrared light. The transmittance curves of the filters are shown in FIG. 11(*b*) below, where the vertical coordinate is an amplitude, and the horizontal coordinate is a wavelength. The responses to near infrared light need to be eliminated to obtain R, G, and B information without interference from other colors. Since a conventional color image sensor carries a filter for filtering near infrared light, the operation in this step is not required. To acquire a variety of spectral information, the multispectral image sensor in this application includes a filter that may allow the passage of near infrared light to acquire spectral data of near infrared light.

2) After the above operation is completed and grayscale values of the four channels R, G0, G1, and B are processed, the entire filter matrix (that is, the filter unit set) may be approximately considered having an arrangement the same as that in FIG. 11(*c*).

3) RGB data obtained after the rearrangement is inputted into a corresponding color signal processing model, thereby outputting a color image. At this point, the RGB color recovery is completed.

A part of the resolution in the filter matrix is sacrificed in the foregoing manner, and 5/9 of spatial information is discarded in a sampling process. For a multispectral image sensor with an original resolution output of 3a*3b, an image resolution of an RGB output of the image sensor is 2a*2b. However, in the foregoing manner, the RGB recovery of the multispectral image sensor can be completed by using a universal color signal processing model, so that the universality and efficiency of the color image recovery can be improved. Therefore, after it is determined that the RGB recovery algorithm is applicable, the image acquisition indicators may be determined according to the recovery effects of the RGB recovery algorithm in different arrangements, and the target manner of the filters in the filter matrix may be determined based on the image acquisition indicators.

Further, in another embodiment of this application, the image acquisition indicators include an information sampling rate, a distortion distance, a distance parameter with respect to a reference channel, and a spectral similarity calculated based on a transmittance curve. The image acquisition indicators being optimal, such as optimal image acquisition indicators, refers to that when the filters are arranged in the target manner, the information sampling rate is greater than a sampling rate threshold, the distortion distance is less than a distortion threshold, the distance parameter is less than a preset distance threshold, and a spectral similarity between adjacent filters is greater than a preset similarity threshold. The sampling rate threshold is determined based on information sampling rates of all candidate manners. The distance threshold is determined based on distortion distances of all the candidate manners.

In this embodiment, the image acquisition indicators include four types of feature parameters: an information sampling rate, a distortion distance, a distance parameter with respect to a reference channel, and a spectral similarity between different filters. The calculation manners of three of the feature parameters are respectively described below. Detailed description is as follows.

1) Information Sampling Rate.

Figure 12:
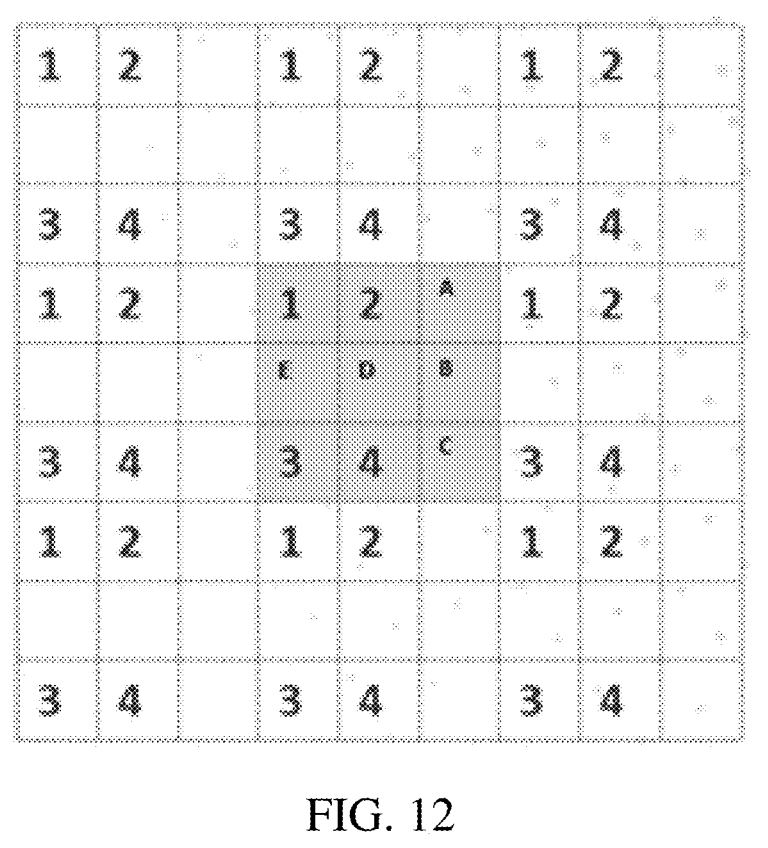

The 3*3 filter matrix continues to be used as an example for description. As described above, during the execution of the RGB recovery algorithm, only four filters provide color information for the RGB recovery algorithm. That is, information of five channels (that is, data acquired by filters at five positions) in the 3*3 array is discarded, and information of only four channels is kept. When the four filters are at different positions in the 3*3 array, the sampling effects on the spatial information of the entire filter matrix are different. Therefore, a sampling effect on the spatial information when the filters of the four colors are at different positions may be indicated by using an information sampling rate. For example, FIG. 12 is a schematic diagram of the arrangement positions of different filters of RGB channels in a filter array according to an embodiment of this application. As shown in FIG. 12, for example, the filter matrix in the filter array is an RGGB matrix. The positions of the four filters (which are respectively filters 1 to 4) in the filter matrix are shown in the figure, so that a corresponding filter array is formed based on the filter matrix. Acquired information corresponding to a pixel A is discarded during the execution of the RGB recovery algorithm. Therefore, if the information of the pixel A needs to be recovered, information of other pixels in neighboring regions of the pixel A is used for supplementation. Among the eight neighboring region pixels of the pixel A, four pixels on the top, bottom, left, and right are closer to the center (that is, the pixel A) than four pixels on the upper left, upper right, lower left, and lower right, and therefore contribute more accurate information. Therefore, an amount of information contributed during the recovery of the information of the pixel A by the pixels in neighboring regions on the top, bottom, left, and right of the pixel A may be recognized as 1, and an amount of information contributed during the recovery of the information of the pixel A by the pixels in neighboring regions on the upper left, upper right, lower left, and lower right may be recognized as 0.707 (that is, $$\frac{1}{\sqrt{2}}).$$

Based on this, when the filter matrix is arranged in the foregoing manner in FIG. 12, among the eight neighboring regions of the pixel A, an RGGB filter is configured respectively in only the four pixels on the upper left, upper right, left, and right, that is, the acquired information of the four pixels are valid. The information of other neighboring region pixels is discarded during RGB recovery, that is, the information is invalid information. Therefore, an amount of information that can be obtained from the neighboring regions for the pixel A is a total sum of the four neighboring regions. That is, $SA=0.707+0.707+1+1=3.414$. Similarly, the amounts of information corresponding to pixels B, C, D, and E may be calculated respectively in the foregoing manner. Eventually, a total amount of information obtained for the five discarded pixels in the 3*3 arrangement is calculated as $S=SA+SB+SC+SD+SE=16.484$. The total amount S of information is used as an information sampling rate of the arrangement. S represents a total amount of information that can be provided for a full-resolution image recovery by the filter matrix corresponding to the RGGB filters in the arrangement. When the total amount of provided information is larger, the data loss is smaller. Therefore, when the information sampling rate is larger, the effect is better. During the determination of the target manner, a corresponding sampling rate threshold may be configured. If an information sampling rate corresponding to a candidate manner is greater than the sampling rate threshold, comparison of other feature parameters may be performed, to determine whether the candidate manner is the target manner.

Further, the sampling rate threshold may be determined according to information sampling rates corresponding to all candidate manners. For example, an information sampling rate with the second largest value in all the candidate manners may be used as the sampling rate threshold, thereby selecting an information sampling rate with the largest value as the sampling rate threshold.

2) Distortion Distance

Figure 13A:
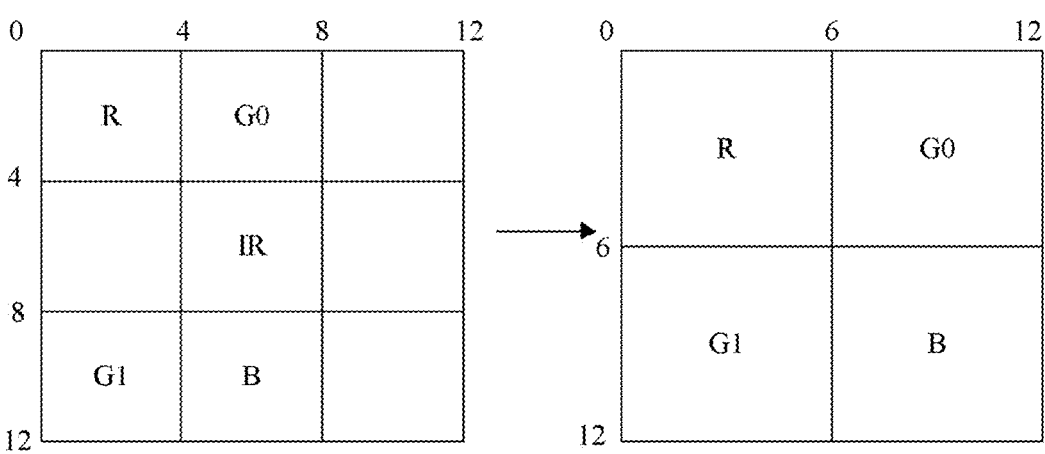
FIG. 13(a) is a schematic diagram of a first manner of calculation of a distortion distance according to an embodiment of this application.
Figure 13B:
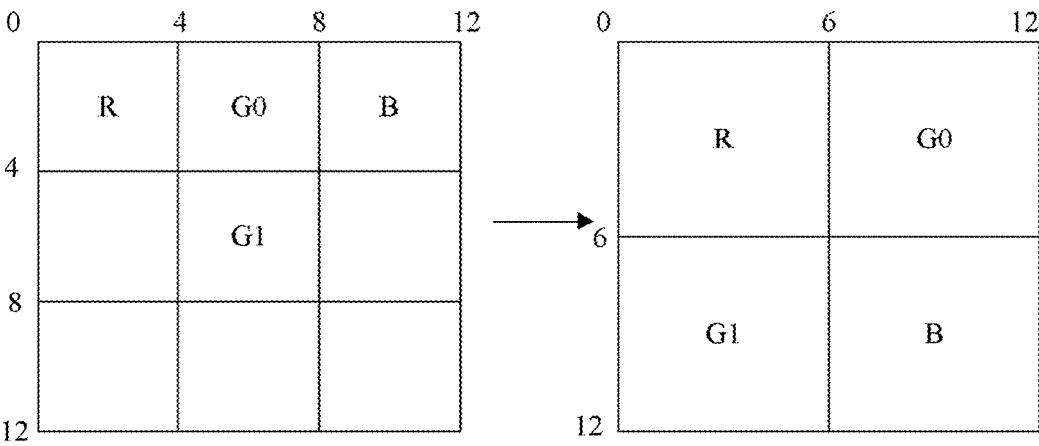
FIG. 13(b) is a schematic diagram of a second manner of calculation of a distortion distance according to an embodiment of this application.

For example, FIG. 13(a) and FIG. 13(b) are schematic diagrams of calculation of a distortion distance according to an embodiment of this application. Referring to FIG. 13(a) and FIG. 13(b), this application provides two arrangements of a filter matrix. The first manner is shown in FIG. 13(a), and the other manner is shown in FIG. 13(b). A 3*3 filter matrix is used as an example for description. A coordinate system is established in a manner in FIG. 13. Certainly, a coordinate system may be established in another manner. The coordinate origin is the upper left corner, and the length and width corresponding to each filter are both 4. In the filter matrix, the center coordinate of a pixel R is (2, 2). After the RGB recovery algorithm is performed (referring to above 1 of the information sampling rate) for the approximate conversion of a matrix, in a matrix after an equivalent approximate RGB recovery, four filters (that is, four filters of RGGB) are used to replace the space occupied by the original nine filters. Therefore, the length and width of each pixel are both changed into 6. In this case, the center coordinate of the pixel R is (3, 3). In the operation of the approximate conversion of a matrix, a distortion amount is introduced for an R channel (that is, a red filter). The distortion amount is $\sqrt{(3-2)^2+(3-2)^2}=\sqrt{2}$, that is, 1.414. Similarly, the distortion amounts of the other three channels may be calculated. The distortion distance is equal to a total sum of the distortion distances of the channels. In different 4-channel arrangement designs, when the distortion distance is smaller, the effect is better. As can be seen, for the arrangement in the foregoing manner in FIG. 13(a), the distortion distance corresponding to the filter matrix is 9.153. In addition, another case needs to be considered in the calculation of the distortion distance. For example, for the arrangement in FIG. 13(b), as shown in the right part of the figure, in the original 3*3 array design, a B channel is located on the right of a G0 channel. After the approximate conversion, the B channel is located below the G0 channel.

Such an approximate conversion that changes the spatial topological positions of the four channels causes relatively severe adverse impact to the RGB effect. Therefore, in this arrangement design, the distortion amount of the G0 channel is multiplied by a penalty factor during the calculation of the total distortion amount. For example, the penalty factor is 2. Similarly, the distortion amount of the B channel also needs to be multiplied by the penalty factor of 2. Therefore, after the penalty factor is calculated, for the arrangement in the foregoing manner in FIG. 13(*b*), a distortion corresponding to the filter matrix is 27.2039. As can be seen, to choose a target manner, a candidate manner with a relatively small distortion distance should be chosen as the target manner. Therefore, if a distortion distance corresponding to a candidate manner is less than the distortion threshold, comparison of other feature parameters may be performed to determine whether the candidate manner is a target manner.

Further, the distortion threshold may be determined according to the distortion distances corresponding to all candidate manners. For example, a distortion distance with the second smallest value in the distortion distances of all the candidate manners may be used as the distortion threshold, thereby selecting a distortion distance with the smallest value as the distortion threshold.

3) Distance Parameter with Respect to a Reference Channel

Figure 14:
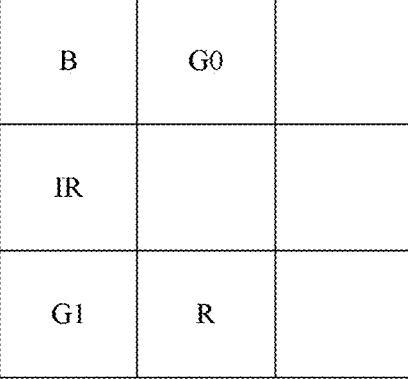
FIG. 14 shows an arrangement manner of filters in a filter matrix according to another embodiment of this application.

As described above, during the execution of the RGB recovery algorithm, the grayscale value of the near infrared light IR channel first needs to be respectively subtracted from the grayscale values of four channels. Therefore, the IR channel may be used as a reference channel. Certainly, in other application scenarios, if a channel corresponding to a filter with another wave band is used as the reference channel, the IR channel may be replaced with a channel of the corresponding wave band. During the execution of the RGB recovery algorithm, IR components in the grayscale values of the four channels are the same as the grayscale value of the IR channel. Therefore, in the determination of the arrangement of the filter matrix, the positions of the filters corresponding to the four channels (that is, the RGGB channels) in the filter matrix need to be as close to the position of the filter corresponding to the IR channel as possible, and the four channels should have distances as close to the IR channel as possible. For this, the distances between the filters corresponding to the four channels and the IR filter and the fluctuation values of the distances are defined. For example, FIG. 14 shows an arrangement of filters in a filter matrix according to another embodiment of this application. Referring to FIG. 13, the distance between the B channel (that is, the filter that may allow the passage of blue light) and the IR channel is 1. The G0 channel is located on the upper left of IR channel. Therefore, the distance between the G0 channel and the IR channel is 1.414 (that is, j). The distances may be determined for the rest in the foregoing manner. Therefore, in the filter matrix obtained in the arrangement, a sum of the distances between the four channels and the IR channel is 1+1+1.414+1.414=4.828. An IR distance fluctuation is a standard deviation of the distances of the four channels and the IR channel, which is 0.239. In different candidate manners of the filter matrix, the effect is better when the sum of the distances and the IR distance fluctuation are smaller.

4) Spectral Similarity Calculated Based on a Transmittance Curve

After the information sampling rate, the distortion distance, and the distance parameter (that is, the sum of distances and the IR distance fluctuation) corresponding to the candidate manners are calculated, all the candidate manners may be quantitatively evaluated. For example, FIG. 15(*a*) and FIG. 15(*b*) show a parameter table of the three parameters in all candidate manners according to diagrams of this application. As shown in FIG. 15(*a*), sequence numbers 1 to 18 are provided from left to right and from to bottom. For specific parameters, reference may be made to the table in FIG. 15(*a*). Therefore, according to the comparison of the information sampling rate, the distortion distance, and the distance parameter with respect to the reference channel (that is, the sum of distances of the IR channels and the IR distance fluctuation) in the candidate manners, the sampling rate threshold, the distortion threshold, the distance threshold may be determined, and an optimal arrangement of the four channels and the reference channel (that is, the IR channel) may be determined as shown in FIG. 15(*b*).

After the positions corresponding to the five channels are determined, filters that need to be placed at the remaining four positions in the matrix may be determined. Because different colors should be distributed as uniformly as possible in space, it should be avoided that filters with close colors are located in close proximity in the 3*3 filter matrix, that is, close colors should be kept from being adjacent to each other as much as possible. The foregoing figure is used as an example for description. Transmittance curves corresponding to the remaining four filters that each has a to-be-determined position are determined, and any filter with a to-be-determined position is placed in a vacant position. A spectral similarity between a transmittance curve of the filter with a to-be-determined position and an adjacent transmittance curve of a filter with a determined position is calculated. A similarity between the two transmittance curves may be determined based on a similarity measurement indicator for a spectral curve used in the field of spectral measurement. For example, a similarity measurement indicator such as a Euclidean distance, a spectral corner, or a related coefficient between two transmittance curves may be used. This is not limited herein. A position with the smallest similarity is determined from a plurality of vacant positions as the position of the filter with a to-be-determined. The position of the filter with a to-be-determined position in the filter matrix is obtained in the foregoing manner, so that a transmittance curve corresponding to each filter has a preset weighting correlation with a transmittance curve of a filter in a neighboring region of the filter. The foregoing steps are sequentially performed for all the filters with a to-be-determined position, so that a corresponding target manner during the arrangement of the filters in the filter matrix may be determined from all the candidate manners.

In an embodiment, based on the calculation manners of the four feature parameters, a terminal device may perform traversal to calculate the parameter values corresponding to the four feature parameters of all candidate manners of the filter matrix, and calculate the image acquisition indicators corresponding to the candidate manners based on the parameter values corresponding to the feature parameters, so that an optimal image acquisition indicator can be chosen, and a candidate manner corresponding to the optimal image acquisition indicator is used as the target manner.

In an embodiment, the multispectral image sensor provided in this embodiment may be integrated in an imaging module. In this case, the imaging module includes the multispectral image sensor, a lens, and a circuit board. At least one multispectral image sensor and at least one lens are arranged on the circuit board. The lens is arranged on the multispectral image sensor, to make incident light pass through the lens to irradiate the multispectral image sensor.

In the embodiments of this application, the image acquisition indicators are determined in a plurality of feature dimensions. The feature dimensions include an information acquisition degree, a distortion degree, a correlation between filters, and a fluctuation range from a center point, to quantitatively assess an acquisition effect of a filter matrix in a plurality of aspects, so that an optimal target arrangement can be accurately and effectively determined, thereby improving the acquisition precision of a multispectral image sensor and the adaptability between application scenarios.

Embodiment 3

In this embodiment of this application, an execution body of a procedure is a terminal device. The terminal device is configured to manufacture the multispectral image sensor in Embodiment 1 or Embodiment 2. That is, the foregoing terminal device may be a manufacturing apparatus of a multispectral image sensor. FIG. 16 is a flowchart of a manufacturing method of a multispectral image sensor according to a first embodiment of this application. Details are as follows.

S1601: Uniformly fill a photoresist of a target color in a filter filling area corresponding to any preset wavelength on a substrate, where the target color is a color matching the preset wavelength.

In this embodiment, when the terminal device manufactures a filter array of a multispectral image sensor, because the filter array includes a plurality of filters corresponding to different preset wavelengths, different photoresists need to be sequentially filled to obtain the filters corresponding to different preset wavelengths. The terminal device may first determine a filling order corresponding to the preset wavelengths in each filter array, and determine a target wavelength corresponding to a current filling period. The target wavelength is a preset wavelength at the top of the filling order of the preset wavelengths requiring filling.

For example, the filter unit set in the filter array is a 3*3 filter matrix. That is, the filter array includes nine filters. If the nine filters correspond to nine different preset wavelengths, corresponding filling orders may be preconfigured for the preset wavelengths, and are respectively 1 to 9. If filling of a filter of the preset wavelength with the filling order of 1 has not been performed, in a current filling period, the preset wavelength with the filling order of 1 is chosen as a target wavelength, and the operation in S1601 is performed. If filling of filters of the preset wavelengths with the filling orders 1 to 4 has not been performed, in the current filling period, the preset wavelength with the next filling order, i.e., the filling order of 5, is selected as the target wavelength, until filling of the filters of all the preset wavelengths are completed.

It needs to be noted that, filling orders corresponding to different preset wavelengths may be preset, and during the actual manufacturing, the filling orders may be adjusted as required. When a plurality of filters may correspond to the same preset wavelength in the filter array, a photoresist may be simultaneously filled at the filling areas of filters corresponding to the same preset wavelength in a plurality of filter unit sets, thereby improving the manufacturing efficiency.

In this embodiment, after determining the target wavelength, that is, determining a preset wavelength requiring filling, the terminal device may determine an area that needs to be filled of the target wavelength in the filter array, that is, the filter filling area. As described above, because one filter array may include a plurality of filter unit sets and each filter unit set includes a filter corresponding to a target wavelength, each filter unit set corresponds to at least one filter filling area of the target wavelength. The terminal device fills a photoresist of a target color matching the target wavelength in the corresponding filter filling area in each filter unit set.

In an embodiment, during the filling of the photoresist in the filter filling area, the photoresist may uniformly cover the filter filling area located on the substrate in a spin coating manner.

In an embodiment, the substrate may be a photosensitive chip. That is, the photosensitive chip is filled at the positions of the filters corresponding to the different preset wavelengths.

S1602: Turn on an irradiation light source within a preset irradiation time, and arrange a photomask between the irradiation light source and the substrate filled with the photoresist, to obtain a filter corresponding to the preset wavelength.

In this embodiment, after completing the filling of the photoresist of the target color in the filter filling area, the terminal device may turn on the irradiation light source and irradiate the substrate filled with the photoresist within preset irradiation time. A preset photomask is configured in a light path between the light source and the substrate. For the substrate irradiated through the photomask, only the photoresist filled in the filter filling area corresponding to the chosen preset wavelength for filtering is kept. That is, the filter corresponding to the chosen preset wavelength has been completed and fixed on the substrate, and a filter corresponding to another preset wavelength may be manufactured.

In an embodiment, the terminal device may place the irradiated substrate in a development device. The uncured photoresist is removed by using a developer in the development device. That is, the photoresist that may exist in an area other than the filter filling area corresponding to the target wavelength is eliminated, so that only the photoresist in the filter filling area is kept on the substrate, that is, the filter corresponding to the target wavelength is generated.

S1603: After irradiation is completed, return to perform the operation of uniformly filling a photoresist of a target color in a filter filling area corresponding to another preset wavelength on a substrate, until all preset wavelengths have corresponding filters on the substrate.

In this embodiment, after the filter corresponding to the target wavelength is obtained, the filters corresponding to other preset wavelengths may be manufactured continually based on the filling order. That is, the operations in S1601 to S1603 are repeated, until the filters corresponding to all the preset wavelengths are obtained.

In an embodiment, the photoresist may be filled by, but not limited to, using the following five manners.

1) Dyeing method. This method mainly includes two major steps: a patterning photoresist manufacturing step and a dyeing step. First, a colorless photoresist is applied to a substrate. An ultraviolet exposure is performed by using a photomask after the photoresist is dried and hardened. A patterned transparent filter is formed after development. Next, transparent photoresists at associated positions (that is, a filter filling area corresponding to a target wavelength) in these patterns are dyed with a dye (that is, a dye of a target color corresponding to the target wavelength), to obtain a filter of a single color. The foregoing process is repeated, so that the filters corresponding to different preset wavelengths may be respectively obtained, to eventually manufacture a color photoresist layer. However, this method has poor heat resistance, light resistance, chemical resistance, and water resistance, a complex process, and high costs.

2) Pigment dispersion method. The method has advantages such as a simple process, stable performance, and reliability. A manufacturing method of the pigment dispersion method is as follows. First, photoresists corresponding to different preset wavelengths are manufactured. Next, a photoresist corresponding to any preset wavelength is applied to a filter filling area associated with the preset wavelength in the substrate. A filter corresponding to the preset wavelength may be manufactured after the photolithography processes such as exposure and development. The filters corresponding to the plurality of different preset wavelengths may be obtained by repeating the foregoing process.

3) Ink jet method. The method includes the following steps. First, a pixel frame of a microlattice formed by a black matrix is formed on a substrate. Next, photoresists of target pigments corresponding to different preset wavelengths are precisely sprayed on filter filling areas corresponding to the pixel frame in an ink jet manner. Next, a protective layer is manufactured through curing, to form filters corresponding to different preset wavelengths. This method has advantages such as low costs, a simple process, a high pigment utilization, and a capability of manufacturing a large multispectral filter, but requires a relatively high printing precision.

4) Photoresist hot melt method. The method mainly includes three steps. Step 1, the photoresist on a substrate is exposed with a target pattern as an exposure pattern (a regular hexagon, a rectangle or a circle) through the masking of a photomask. Step 2, the residues are cleaned. Step 3, heating is performed on a heating platform to implement hot melting formation. The advantages include a simple process, low material and device requirements, easily expandable production, and easy control of process parameters.

5) Laser direct writing technique. A laser direct writing method mainly includes the following steps. Step 1, an exposure structure of a microlens array is designed on a computer. Step 2, a design pattern is written in a laser direct writing device. Step 1, a substrate with a photoresist is placed on a writing platform corresponding to the direct writing device, laser writing is performed, and the residues on a surface are cleaned after writing, to obtain an array structure. The technique has advantages including a high precision, applicability to model manufacturing, easily expandable production, a high quality, and low costs.

S1604: Recognize the substrate filled with the filters corresponding to all the preset wavelengths as a filter array, and obtain a multispectral image sensor based on the filter array. The filter array includes at least one filter unit set, filters in the filter unit set are arranged in a preset target arrangement, and the target arrangement is an arrangement corresponding to image acquisition indicators corresponding to the filter unit set that is optimal.

In this embodiment, the terminal device may manufacture filters corresponding to different preset wavelengths on a substrate in the foregoing manner. Therefore, the substrate filled with photoresists of different colors may be recognized as a filter array, and the filter array, the photosensitive chip, and the microlens array are packaged to obtain a multispectral image sensor. During the determination of filter filling areas of the preset wavelength on the substrate, the filter filling areas are determined in a target arrangement with the optimal image acquisition indicators. Therefore, the filters in the filter unit sets formed on the substrate are also arranged in a preset target arrangement, to implement the optimal image acquisition.

In an embodiment, after the manufacturing of all filters is completed, an uneven surface may exist on the filters, which tends to increase the reflectivity of the incident light, leading to reduced luminous flux. Therefore, before a microlens array is manufactured, a top planarization layer may be further applied at a top of the substrate after filling to improve the planarization of the surface of the photosensitive chip, thereby reducing the reflectivity of the incident light. The planarization layer is manufactured by using an application process. A planarization layer material is applied to the filter layer on the surface of the photosensitive chip. Next, the top planarization layer is formed through baking or ultraviolet curing. In addition to reducing the reflectivity, the top planarization layer further protects the filter layer.

In an embodiment, a manner of manufacturing the microlens array may be as follows. A photoresist, which is a transparent photoresist with a relatively high transmittance, is uniformly applied to the top planarization layer in a spin coating manner by using a coater. The temperature and speed in a spin coating process are controlled within the preset ranges. Next, similar to the manufacturing of a filter, a photomask above the photoresist is exposed by using ultraviolet light, the photoresist in a specific area is cured, and then the uncured photoresist is removed by using a developer. Finally, the photosensitive chip is placed on the heating platform for heating and baking, to melt the cured photoresist into the microlens array. A single microlens may have a shape such as a regular hexagon, a rectangle, or a circle.

Further, in another embodiment of this application, before S1601, the terminal device may determine the target arrangement of the filters, including determining the filter filling area corresponding to the preset wavelength in each filter unit set according to the target arrangement.

The terminal device may calculate image acquisition indicators corresponding to candidate arrangements, and determine a target arrangement based on the image acquisition indicators. The image acquisition indicators include an information sampling rate, a distortion distance, a distance parameter with respect to a reference channel, and a spectral similarity calculated based on a transmittance curve. The optimal image acquisition indicators refers to that when the filters are arranged in the target manner, the information sampling rate is greater than a sampling rate threshold, the distortion distance is less than a distortion threshold, the distance parameter is less than a preset distance threshold, and a spectral similarity between adjacent filters is greater than a preset similarity threshold. The sampling rate threshold is determined based on information sampling rates of all candidate manners. The distance threshold is determined based on distortion distances of all the candidate manners. For a specific calculation manner and a specific determination manner, reference may be made to the description of the previous embodiment. Details are not described herein again.

Further, in another embodiment of this application, before S1602, the method may further include: uniformly applying a glue to the substrate, and curing the glue, to form a planarization layer on the substrate; and uniformly filling the photoresist of the target color in the filter filling area on the planarization layer of the substrate.

In this embodiment, to ensure that the filter array has a flat bottom, before the filters in the filter array are manufactured, the substrate may be planarized first. That is, a planarization layer (e.g., planarization layer PL) is manufactured on the substrate, covering the surface of the substrate of the photosensitive chip. In a procedure of manufacturing the planarization layer, a layer of planarization glue is applied to the surface of the substrate first, and then baking or ultraviolet curing is performed. The planarization layer improves the flatness of the photosensitive chip at the bottom, increases the adhesive force of the color filter, and protects the photosensitive chip.

Figures 17A, 17B, 17C, 17D, 17E:
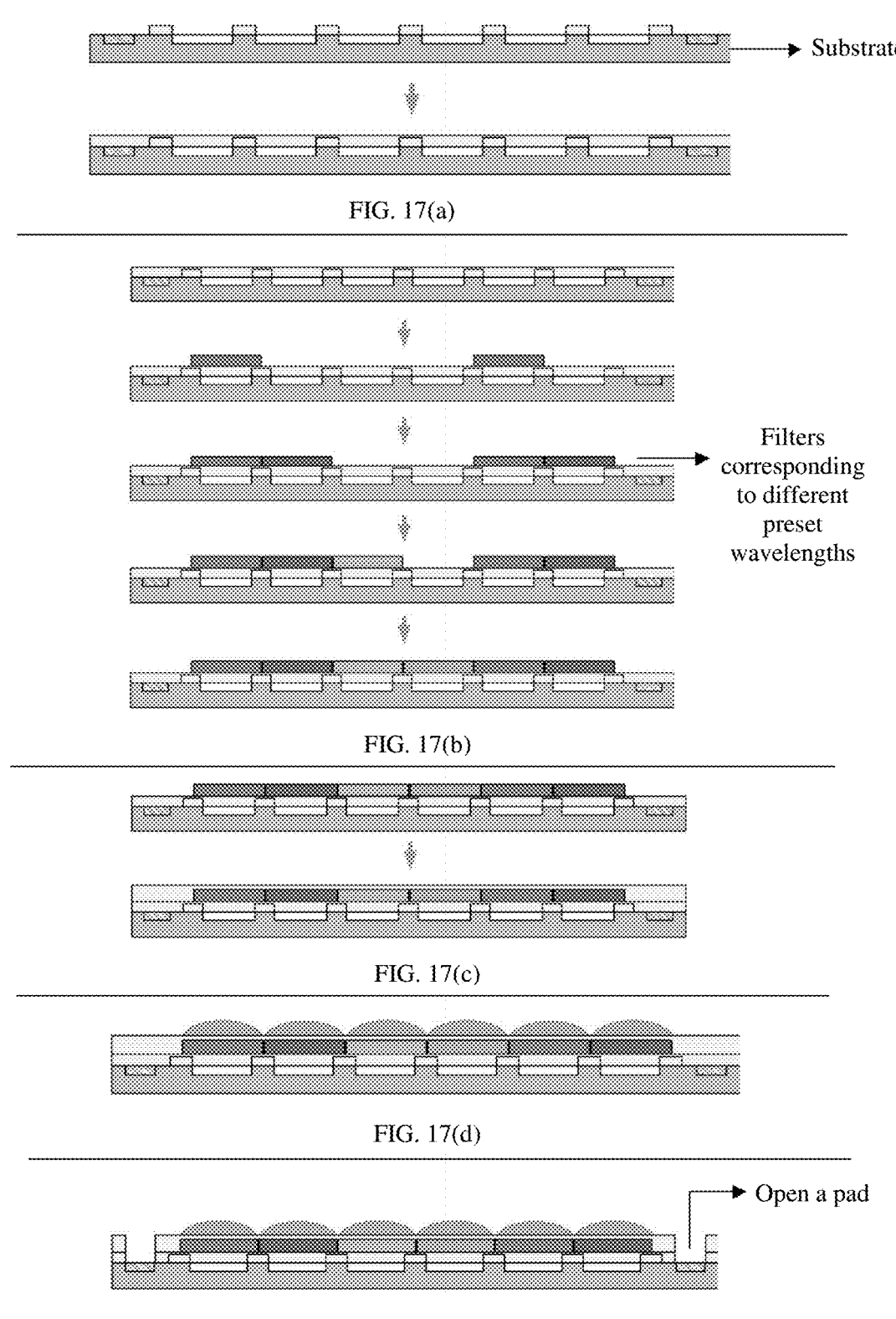
FIG. 17(a) to FIG. 17(e) illustrate a flowchart of manufacturing a multispectral image sensor according to an embodiment of this application.

For example, FIG. 17(a) to FIG. 17(e) are schematics of a manufacturing flow of a multispectral image sensor according to an embodiment of this application. Referring to FIG. 17(a) to FIG. 17(e), the manufacturing includes a plurality of steps as follows. Step 1, An early-stage test is performed on a substrate (that is, a photosensitive chip). The appearance of the substrate is preliminarily recognized. If the photosensitive chip recognizes no abnormality, a next step is performed. Step 2, A planarization layer PL is manufactured on the photosensitive chip, as shown in FIG. 17(a). For a specific implementation process, reference may be made to the foregoing description. Details are not described herein again. Step 3, Filters corresponding to different preset wavelengths are sequentially filled on the substrate by using the steps of S1601 to S1604, as shown in FIG. 17(b). Step 4, Top planarization: A corresponding top planarization layer is configured after the filters are completed, as shown in FIG. 17(c). Step 5, A microlens array is manufactured, as shown in FIG. 17(d). Step 6, A pad is opened. At the end of a microlens process, a material (for example, resin) covering the pad is removed in an exposure form, and the pad is opened, to facilitate use in subsequent packaging and test processes, as shown in FIG. 17(e). Step 7, Packaging: The manufactured devices are packaged, thereby obtaining the manufactured multispectral image sensor.

As can be seen from above, in the manufacturing method of a multispectral image sensor provided in the embodiments of this application, photoresists of different preset wavelengths are respectively filled on a substrate, to obtain a filter array including different preset wavelengths, and a multispectral image sensor is generated based on the filter array. The multispectral image sensor generated in this manner may simultaneously acquire a multispectral image of an object under test, so that the simultaneous acquisition of the optical signals in a plurality of different wave bands and the generation of multispectral image data can be implemented, thereby ensuring the real-time performance of acquisition of different channels in the multispectral image data, and providing the precision and efficiency of imaging.

Embodiment 4

In this embodiment of this application, an execution body of a procedure is a terminal device. The terminal device is configured to determine a specific manufacturing manner of the multispectral image sensor in Embodiment 1 or Embodiment 2. That is, the foregoing terminal device may be a manufacturing apparatus of a multispectral image sensor, and determine a target manufacturing manner from various candidate manufacturing manners. FIG. 18 is an implementation flowchart of a manufacturing method of a multispectral image sensor according to a first embodiment of this application. Details are as follows.

S1801: Respectively obtain feature parameter sets of a plurality of filters corresponding to wavelengths that are not identical in a filter unit set. The multispectral image sensor includes at least one filter unit set, the multispectral image sensor is manufactured in any candidate manufacturing manner, and different feature parameter sets correspond to different candidate manufacturing manners.

In this embodiment, during the manufacturing of a multispectral image sensor, to improve the adaptability between the multispectral image sensor and application scenarios and improve the accuracy of image acquisition of the multispectral image sensor, an optimal manufacturing manner of the multispectral image sensor may be determined. The optimal manufacturing manner may be determined as a target manufacturing manner, and the multispectral image sensor is manufactured based on the target manufacturing manner. Based on this, the terminal device needs to obtain detection accuracies corresponding to different candidate manufacturing manners, and determine the target manufacturing manner based on the detection accuracies.

In this embodiment, the terminal device may manufacture corresponding multispectral image sensors in different candidate manufacturing manners. The multispectral image sensor includes at least one filter unit set, and the filter unit set includes filters corresponding to different preset wavelengths.

Different manufacturing manners all have an impact on the filter features of filters in the multispectral image sensor. For example, the filters are obtained based on a photoresist. Therefore, a manufacturing manner of the photoresist is one of the manufacturing steps of the multispectral image sensor. Therefore, the determined manufacturing manner of the multispectral image sensor may include manufacturing steps of various raw materials and steps of obtaining the multispectral image sensor through assembly based on the manufacturing steps of the various raw materials.

The manufacturing steps of a photoresist as a raw material are used as an example for description. The main components of the photoresist include an alkali soluble resin, a light-curing resin, a pigment, a photoinitiator, an organic solvent, and an additive. A photoresist obtained based on a pigment dispersion method is a negative photoresist. The molecular bonds in the negative photoresist are crosslinked due to the irradiation of light to be tightly bonded. A part covered by a photomask tends to be washed away by a developer due to the lack of crosslinking between molecules, so that the photoresist in an irradiated area is kept, to obtain a filter. The alkali soluble resin is used to wash away a photoresist in an unexposed area during the development. Because an alkali solution is used during the development, the resin needs to have a certain acid value to react with an alkali developer during the development, thereby cleaning an unexposed area. The photoinitiator can rapidly form free radicals or active ionic groups during the illumination, to enable a crosslinking reaction in the light-curing resin. The pigment colors the photoresist, and the saturation of the color photoresist is determined by the pigment. A common pigment in the pigment dispersion method may be an organic pigment such as a phthalocyanine class pigment or a DPP class pigment. An appropriate surface refinement may be performed on the pigment, to keep the grain size of the pigment within a preset threshold range, thereby improving the transmittance of a filter. In the pigment dispersion method, a pigment is first pre-dispersed in a dispersant, so that the pigment, the dispersant, and the organic solvent are fully mixed. Then the pre-dispersed liquid is poured into a sander, and an appropriate rotational speed and an appropriate energy input are set. The grain size of the sanded pigment stock solution should be kept in a preset grain size range, and present a normal distribution. The pigment stock solution may have an adequate storage stability, to allow the pigment stock solution to be stored at a room temperature for a month without significant changes in the grain size. The organic solvent may adjust the viscosity of the color photoresist to make the color photoresist to approximate to an ideal Newtonian fluid, to allow uniform rotation and application during filling. Other additives are as follows. An antifoamer can accelerate the elimination of bubbles in the photoresist, thereby improving the film forming performance and moistening. A dispersant can ensure that solid particles are well dispersed and remain stable in the photoresist. A leveling agent can improve the flatness, gloss, and the like of a coating. Therefore, during the determination of the manufacturing steps of the photoresist, the addition proportions of the various raw materials and related manufacturing steps need to be determined. That is, during the determination of the target manufacturing manner, the addition proportions of the various raw materials and the related manufacturing steps during the manufacturing of the photoresist also need to be determined.

In this embodiment, the feature parameter set corresponding to the filter is used for determining a filter feature corresponding to the filter obtained based on the candidate manufacturing manner. The feature parameter set may include a transmittance curve, a center wavelength, a full width at half maximum, and the like of the filter.

In an embodiment, the terminal device may respectively acquire feature parameter sets of the filter obtained in different manufacturing manners, and form a feature database based on feature parameter sets obtained in all manufacturing manners. When need to manufacture a multispectral image sensor corresponding to an application scenario, the terminal device may directly extract a feature parameter set of the filter generated in a corresponding candidate manufacturing manner from the feature database, so that the efficiency of determining a target manufacturing manner can be greatly improved.

S1802: Introduce the feature parameter sets corresponding to all the filters and a preset parameter set into a preset feature vector conversion model, to obtain a plurality of feature vectors based on different detection targets.

In this embodiment, in addition to obtaining the feature parameter set corresponding to the filter obtained in the candidate manufacturing manner, the terminal device may further obtain a preset parameter set obtained based on a plurality of different detection targets. The preset parameter set is acquired after a detection target is irradiated by a preset light source. The preset parameter set may include a spectral curve related to the preset light source and a reflectivity curve related to the detection target. The selection of a detection target is determined based on an application scenario used in the filter unit set. For example, if the filter unit set needs to be applied to a liveness detection scenario, the detection target may be a plurality of living people and a plurality of dummies.

In this embodiment, the terminal device may introduce feature parameter sets of all filters in a same filter unit set and the preset parameter set into a preset feature vector conversion model, so that a plurality of feature vectors obtained based on different detection targets may be obtained. Different detection targets may correspond to one feature vector. The feature vector may be used for determining a recognition grayscale value corresponding to the detection target, so that it may be determined, according to recognition grayscale values corresponding to a plurality of different detection targets, whether a filter unit set with filters arranged in a preset manner matches a corresponding application scenario.

Further, in another embodiment of this application, the feature parameter set includes reflectivity curves after light from light sources passes through corresponding filter and a transmittance curve of the filter. In this case, S1802 may include the following steps:

Step 1: Introduce the transmittance curve corresponding to the filter, spectral curves of the plurality of light sources, and the reflectivity curve of the detection target into the feature vector conversion model, to calculate feature values obtained based on the detection target. The feature vector conversion model is:

$$DN_i = k \int_{\lambda_0}^{\lambda_1} S(\lambda) \cdot R_i(\lambda) \cdot T_i(\lambda) \cdot \eta(\lambda) d\lambda,$$

where $DN_i$ is a feature value corresponding to an $i^{th}$ filter in the filter unit set; $S(\lambda)$ is a spectral curve of a light source; $R_i(\lambda)$ is the reflectivity curve of the detection target; $T_i(\lambda)$ is a transmittance curve of the $i^{th}$ filter; $\eta(\lambda)$ is a quantum efficiency curve of the multispectral image sensor; k is a photovoltaic conversion coefficient of the multispectral image sensor; and $\lambda 0$ and $\lambda 1$ are wave band ranges corresponding to a plurality of spectrums.

Step 2: Obtain the feature vector based on the feature values corresponding to all the filters in the filter unit set.

In this embodiment, when obtaining a feature parameter set of a filter, the terminal device may turn on a preset light source. The light source irradiates a detection target. Incident light is reflected by the detection target, to obtain the corresponding reflected light. The reflected light may irradiate a filter unit set. That is, the reflected light passes through the filters in the filter unit set and is recorded. The terminal device may obtain preset parameter sets corresponding to different detection targets based on the preset light source and transmittance curves corresponding to the filters, and determine corresponding feature vectors. Therefore, the preset parameter group includes a spectral curve of the light source and a reflectivity curve of the detection target. A wave band range of the light source is between $\lambda_0$ and $\lambda_1$. The terminal device has pre-stored a quantum efficiency curve corresponding to a photosensitive chip in the multispectral image sensor. Based on this, the terminal device may introduce all the acquired various parameters into a feature vector conversion function, thereby respectively calculating feature values obtained based on various detection targets. Finally, a feature vector is generated according to the feature values of all the filters. The feature vector includes the feature values corresponding to the filters. Because each feature vector corresponds to one detection target, to determine the recognition accuracy corresponding to the filter unit set, feature vectors of a plurality of different detection targets are obtained.

S1803: Introduce the plurality of feature vectors into a detection model corresponding to an application scenario type associated with the multispectral image sensor, and calculate a corresponding detection accuracy.

In this embodiment, after determining the feature vector corresponding to the multispectral image sensor manufactured based on the candidate feature manner, the terminal device may determine matching between the feature vector and an application scenario in which the multispectral image sensor is used. That is, the matching is measured by using a detection accuracy. If the value of the detection accuracy is larger, the matching between the multispectral image sensor and the application scenario is higher. In contrast, if the value of the detection accuracy is smaller, the matching between the spectral image sensor and the application scenario is lower. Therefore, an optimal candidate manufacturing manner may be chosen by calculating the detection accuracy.

For example, the application scenario type may be a liveness detection scenario type. The terminal device may obtain a detection model configured to determine a liveness detection accuracy. The detection model is a liveness recognition and detection model. In this case, S1803 includes: obtaining the liveness recognition and detection model associated with the liveness recognition scenario type, where a liveness recognition score model is configured to determine an accuracy of liveness recognition using the feature vectors; and introducing the plurality of feature vectors into the liveness recognition and detection model, to calculate a detection accuracy when liveness recognition is performed by using the multispectral image sensor obtained in the candidate manufacturing manner.

In this embodiment, the terminal device may introduce a feature vector into the liveness recognition and detection model, and may determine a corresponding recognition accuracy when liveness recognition is performed based on the multispectral image sensor. The feature vector is introduced into the score model, and the recognition accuracy and detection rate when liveness detection is performed by using the multispectral image sensor, that is, the detection accuracy, may be determined.

In an embodiment, the application scenario type includes a liveness detection scenario type, a facial detection scenario type, a vegetation ecology recognition scenario type, and the like. Different scenario types correspond to different detection models, and all detection models are stored in a model library. Based on this, the terminal device may choose a matching detection model from the model library according to an application scenario type that the multispectral image sensor needs to use, and introduce the feature vector into the detection model to calculate a detection accuracy.

Further, in another embodiment of this application, before S1803, the terminal device may further generate a score model, including the following three steps.

Step 1: Obtain spectral curves corresponding to a plurality of light sources in different light source scenarios, to obtain a light source database.

Step 2: Determine reflectivity curves corresponding to several detection targets associated with the application scenario type in the different light source scenarios based on the light source database, to obtain a recognition object database.

Step 3: Generate the detection model based on the light source database and the recognition object database.

In this embodiment, to determine a matching degree between the multispectral image sensor and an application scenario type, the terminal device may construct a corresponding light source database and a corresponding object database. The light source database is determined based on spectral curves corresponding to a plurality of light sources in a plurality of different light source scenarios. The object database is determined according to reflectivity curves of different detection targets. For example, in a liveness recognition scenario type, the different object types are respectively a liveness detection target and a non-liveness detection target. In a facial recognition scenario type, the different object types may be a male facial detection target, a female detection target, and the like. The feature vector of the multispectral image sensor is generated based on a transmittance curve of a filter and a reflectivity curve of a detection target. Therefore, the detection model constructed based on the light source database and the object database may determine the accuracy of recognition of the feature vector in the application scenario type.

The object database may be formed according to samples of a plurality of detection targets and sample labels of the detection targets. The sample labels are used for determining object types of the detection targets. The plurality of detection targets may be divided into a training set and a test set. The training set is used for training a naive network model. The test set is used for determining the recognition accuracy of a network model after training. The network model that has been adjusted based on the test set and the training set is used as the score model.

S1804: Choose a feature parameter set of the filter unit set corresponding to the highest detection accuracy according to detection accuracies corresponding to all candidate manufacturing manners, and a candidate manufacturing manner of the multispectral image sensor corresponding to the feature parameter set as an initial manufacturing manner of the multispectral image sensor.

In this embodiment, the terminal device may choose a candidate manufacturing manner with the highest matching degree with an application scenario type as an initial manufacturing manner corresponding to the multispectral image sensor according to detection accuracies corresponding to candidate manufacturing manners. The initial manufacturing manner determines classes of chosen filters in the filter unit set and a relative position relationship between the various classes of filters. In other words, the initial manufacturing manner is used for determining an arrangement of the filters in the filter unit set.

Further, in another embodiment of this application, after the choosing a feature parameter set of the filter unit set corresponding to the highest detection accuracy according to detection accuracies corresponding to all candidate manufacturing manners, and a candidate manufacturing manner of the multispectral image sensor corresponding to the feature parameter set as an initial manufacturing manner of the multispectral image sensor, the method further includes: iteratively optimizing the feature parameter set of the filters corresponding to the initial manufacturing manner of the multispectral image sensor to determine an optimal manufacturing manner of the multispectral image sensor. The manner includes, but not limited to, the following two manners.

Manner 1: The weight of the transmittance in a specific operating wave band range in the transmittance curves of the plurality of filters is increased, and an updated feature parameter set of the plurality of filters is obtained. The specific operating wave band range is determined based on the reflectivity curves of the plurality of detection targets.

Manner 2: Updated feature parameter sets and a preset parameter set are introduced into a preset feature vector conversion model, to obtain a plurality of updated feature vectors based on different detection targets.

introducing the plurality of updated feature vectors into a liveness detection model, and calculating an updated detection accuracy; and adjusting shapes and amplitudes of the transmittance curves corresponding to the filters according to the updated detection accuracy.

In this embodiment, a manufacturing manner includes determining an arrangement and manufacturing processes of different filters in a filter unit set. Based on this, the terminal device may first determine an initial manufacturing manner of the filters in the multispectral image sensor, and may iteratively optimize the initial manufacturing manner, thereby improving the recognition accuracy of the filter unit set. A manner of iterative optimization is adjusting weight values of the transmittance in a preset operating wave band range in the transmittance curves of the filters.

In this embodiment, the terminal device may adjust the manufacturing processes of the filters to change the shape and amplitude of the transmittance curves of the filters, to increase corresponding weight values in a specific operating wave band, thereby improving the diversity in recognizing different types of detection targets, to achieve an optimal recognition accuracy. Based on this, because a manufacturing process may change a transmittance curve of a filter and different specific operating wave band ranges are associated with different application scenarios, the terminal device may determine, according to an application scenario type, a specific operating wave band range associated with the application scenario type.

In this embodiment, after iteratively optimizing the transmittance curves of the filters, the terminal device may perform a verification operation, that is, determine a corresponding feature parameter set based on the updated transmittance curve, and recalculate an updated feature vector corresponding to the updated transmittance curves and a preset parameter set, so that a corresponding detection accuracy can be determined. The transmittance curves are optimized based on the detection accuracy. By analogy, the foregoing steps are repeated until the detection accuracy reaches an optimal value, and a manufacturing manner corresponding to transmittance curves with the reached optimal value is used as a target manufacturing manner of the filter unit set.

In an embodiment, before step 2, a critical feature wave band corresponding to an application scenario type may be determined, which may include the following steps.

Step 11: Obtain reflectivity curves of different types of detection targets corresponding to the application scenario type.

Step 12: Determine discrete indicators corresponding to wave bands according to the reflectivity curves of the different types of detection targets.

Step 13: Choose a wave band with the discrete indicator greater than a preset discrete threshold as a specific operating wave band range.

In this embodiment, the application scenario type may be associated with different types of detection targets. The terminal device may obtain the reflectivity curves of the different types of detection targets. The reflectivity curves may be curves obtained through reflection of various types of detection targets under a preset light source. The terminal device may compare discrete indicators corresponding to the reflectivity curves of the different types of detection targets in different wave bands. When a discrete degree is larger, it indicates that in a wave band, the reflectivity curves of the different types of detection targets have larger differences. Therefore, during the type recognition of a detection target, the wave band can better reflect differences between different types of detection targets. Based on this, a wave band with the discrete indicator greater than the preset discrete threshold is chosen as the critical feature wave band.

As can be seen from above, in the manufacturing method of a multispectral image sensor provided in the embodiments of this application, feature parameter sets of a plurality of filters corresponding to preset wavelengths that are not identical in a filter unit set based on any candidate manufacturing manner are obtained. The feature parameter sets corresponding to all the filters and a preset parameter set are introduced into a preset feature vector conversion model. A feature vector corresponding to the filter unit set is determined, thereby obtaining a detection accuracy corresponding to the candidate manufacturing manner, to determine whether a multispectral image sensor manufactured in the candidate manufacturing manner adapt to an application scenario, thereby further determining a candidate manufacturing manner with the highest adaptability. The candidate manufacturing manner is used as an initial manufacturing manner of the multispectral image sensor. The initial manufacturing manner determines an arrangement of filters that need to be chosen. Next, the initial manufacturing manner may be iteratively optimized, to further improve a subsequent detection accuracy. Through the embodiments of this application, a multispectral image sensor with a filter unit set including a plurality of filters corresponding to preset wavelengths that are not identical may be manufactured, to implement simultaneous acquisition of different spectrums during imaging, thereby improving the precision, efficiency, and accuracy of imaging.

It is to be understood that the order of the sequence numbers of the steps in the foregoing embodiments does not mean the order of execution, and the execution order of each process is determined by its function and inherent logic, and does not constitute any limitation on the implementation process of the embodiments of this application.

Figure 19:
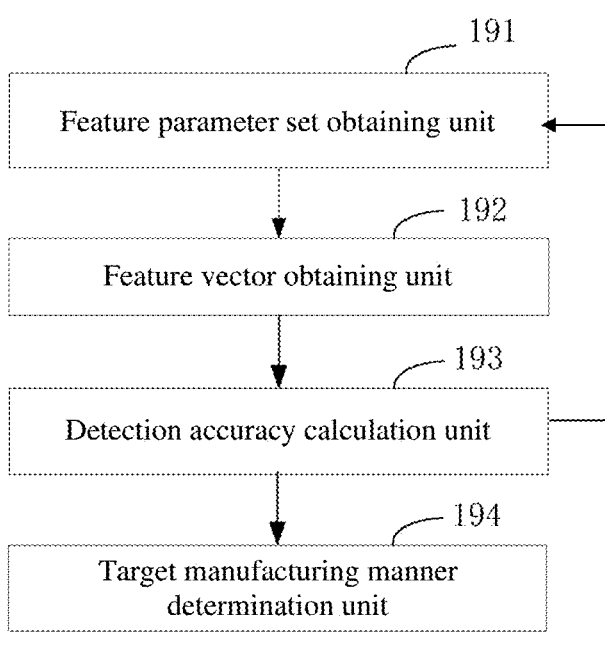
FIG. 19 is a structural block diagram of a manufacturing apparatus of a multispectral image sensor according to an embodiment of this application.

FIG. 19 is a structural block diagram of a manufacturing apparatus of a multispectral image sensor according to an embodiment of this application. The units included in the manufacturing apparatus of a multispectral image sensor are configured to perform the steps in the embodiment corresponding to FIG. 18. For details, reference may be made to FIG. 18 and the related description of the embodiment corresponding to FIG. 18. For ease of description, only the part related to this embodiment is shown.

Referring to FIG. 19, the manufacturing apparatus of a multispectral image sensor includes:

a feature parameter set obtaining unit 191, configured to obtain feature parameter sets of a plurality of filters corresponding to different wavelengths in a filter unit set, where the multispectral image sensor includes at least one filter unit set, the multispectral image sensor is manufactured in one of candidate manufacturing methods, and the feature parameter sets correspond to different candidate manufacturing manners;

a feature vector obtaining unit 192, configured to input the feature parameter sets corresponding to all the filters and a preset parameter set into a preset feature vector conversion model, to obtain a plurality of feature vectors based on the detection targets;

a detection accuracy calculation unit 193, configured to input the plurality of feature vectors into a detection model corresponding to an application scenario type associated with the multispectral image sensor, and calculate a corresponding detection accuracy; and a target manufacturing manner determination unit 194, configured to select a feature parameter set of the filter unit set corresponding to the highest detection accuracy among detection accuracies corresponding to all candidate manufacturing methods, and use a candidate manufacturing method of the multispectral image sensor corresponding to the selected feature parameter set as an initial manufacturing method of the multispectral image sensor.

In an embodiment, the selected feature parameter set includes transmittance curves corresponding to the plurality of filters, and the preset parameter set includes spectral curves of a plurality of light sources and reflectivity curves of a plurality of detection targets;

the feature vector obtaining unit 192 includes:

a feature value calculation unit, configured to input the transmittance curves corresponding to the filters, the spectral curves of the plurality of light sources, and the reflectivity curves of the detection targets into the feature vector conversion model, to calculate feature values based on the detection targets:

$$DN_i = k \int_{\lambda_0}^{\lambda_1} S(\lambda) \cdot R_i(\lambda) \cdot T_i(\lambda) \cdot \eta(\lambda) d\lambda,$$

where $DN_i$ is a feature value corresponding to an $i^{th}$ filter in the filter unit set; $S(\lambda)$ is a spectral curve of a light source; $R_i(\lambda)$ is a reflectivity curve of a detection target; $T_i(\lambda)$ is a transmittance curve of the $i^{th}$ filter; $\eta(\lambda)$ is a quantum efficiency curve of the multispectral image sensor; k is a photovoltaic conversion coefficient of the multispectral image sensor; and $\lambda0$ and $\lambda1$ are wave band ranges corresponding to a plurality of spectrums; and a feature vector generation unit, configured to obtain the feature vectors based on the feature values corresponding to all the filters in the filter unit set.

In an embodiment, the manufacturing apparatus of a multispectral image sensor further includes:

an iterative optimization unit, configured to iteratively optimize the feature parameter sets of the filters corresponding to the initial manufacturing method of the multispectral image sensor to determine an optimal manufacturing method of the multispectral image sensor, including: increasing a weight of a transmittance in a specific operating wave band in the transmittance curves of the plurality of filters, and obtaining updated feature parameter sets of the plurality of filters, where the specific operating wave band is determined based on the reflectivity curves of the plurality of detection targets.

In an embodiment, the iterative optimization unit further includes:

an updated feature vector obtaining unit, configured to input the updated feature parameter sets and the preset parameter set into the preset feature vector conversion model, to obtain a plurality of updated feature vectors based on the different detection targets; and a detection accuracy update unit, configured to input the plurality of updated feature vectors into a liveness detection model, and calculate an updated detection accuracy; and a transmittance curve optimization unit, configured to adjust shapes and amplitudes of the transmittance curves corresponding to the filters according to the updated detection accuracy.

In an embodiment, the manufacturing apparatus of a multispectral image sensor further includes:

a reflectivity curve obtaining unit, configured to obtain reflectivity curves of detection targets corresponding to the application scenario type;

a discrete indicator obtaining unit, configured to determine discrete indicators corresponding to wave bands according to the reflectivity curves of the detection targets corresponding to the application scenario type; and a critical feature wave band determination unit, configured to select a wave band with a discrete indicator greater than a preset discrete threshold as the specific operating wave band range.

In an embodiment, the manufacturing apparatus of a multispectral image sensor further includes:

a light source database obtaining unit, configured to obtain spectral curves corresponding to a plurality of light sources in different light source scenarios, to obtain a light source database;

an object database obtaining unit, configured to determine reflectivity curves corresponding to a plurality of detection targets associated with the application scenario type in the different light source scenarios based on the light source database, to obtain a recognition object database; and a score model generation unit, configured to generate the detection model based on the light source database and the recognition object database.

In an embodiment, the application scenario type is a liveness recognition scenario type, and the detection accuracy calculation unit 193 includes:

a liveness recognition score model obtaining unit, configured to obtain a liveness recognition and detection model associated with the liveness recognition scenario type, where a liveness recognition score model is configured to determine an accuracy of liveness recognition using the feature vectors; and an accuracy calculation unit, configured to input the plurality of feature vectors into the liveness recognition and detection model, and performing liveness recognition using the image sensor obtained in the candidate manufacturing method, to calculate a detection accuracy.

Figure 20:
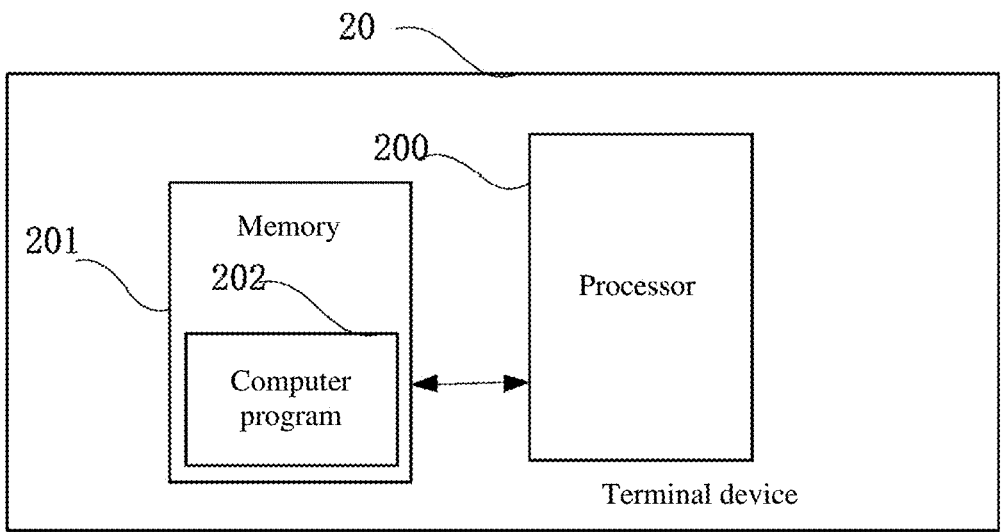
FIG. 20 is a schematic diagram of a terminal device according to another embodiment of this application.

FIG. 20 is a schematic diagram of a terminal device according to another embodiment of this application. As shown in FIG. 20, the terminal device 20 in this embodiment includes: a processor 200, a memory 201, and a computer program 202 stored in the memory 201 and runnable on the processor 200, for example, a manufacturing program of a multispectral image sensor. The processor 200, when executing the computer program 202, implements the steps in the foregoing embodiments of the manufacturing method of a multispectral image sensor, for example, S1801 to S1804 shown in FIG. 18. In an embodiment, the processor 200, when executing the computer program 202, implements the functions of the units in the foregoing apparatus embodiments, for example, the functions of the units/modules 191 to 194 shown in FIG. 19.

For example, the computer program 202 may be divided into one or more units. The one or more units are stored in the memory 201 and are executed by the processor 200 to complete this application. The one or more units may be a series of computer program instruction segments that can complete specific functions. The instruction segments are used for describing an execution process of the computer program 202 in the terminal device 20.

The terminal device may include, but not limited to, the processor 200 and the memory 201. A person skilled in the art may understand that FIG. 20 is merely an example of the terminal device 20, and does not constitute a limitation to the terminal device 20, and the terminal device may include more or fewer components than those shown in the figure, or some components may be combined, or different components may be used. For example, the terminal device may further include an input/output device, a network access device, a bus, and the like.

The processor 200 may be a central processing unit (Central Processing Unit, CPU), or may be another general purpose processor, a digital signal processor (Digital Signal Processor, DSP), an application-specific integrated circuit (Application Specific Integrated Circuit, ASIC), a field programmable gate array (Field-Programmable Gate Array, FPGA) or another programmable logical device, a discrete gate, a transistor logic device, or a discrete hardware component. The general-purpose processor may be a microprocessor, or the processor may be any conventional processor and the like.

The memory 201 may be an internal storage unit of the terminal device 20, for example, a hard disk or a main memory of the terminal device 20. The memory 201 may be an external storage device of the terminal device 20, for example, a removable hard disk, a smart memory card (Smart Media Card, SMC), a secure digital (Secure Digital, SD) card, or a flash card (Flash Card) equipped on the terminal device 20. Further, the memory 201 may include both an internal storage unit and an external storage device of the terminal device 20. The memory 201 is configured to store the computer program and another program and data that are required by the terminal device. The memory 201 may be further configured to temporarily store data that has been output or data to be output.

In addition, the functional units in the embodiments of this application may be integrated into one processing unit, or each of the which may exist alone physically, or two or more units are integrated into one unit. The integrated unit may be implemented in the form of hardware, or may be implemented in the form of a software function unit.

The foregoing embodiments are merely for describing the technical solutions of this application, but not for limiting this application. Although this application is described in detail with reference to the foregoing embodiments, it is to be understood by a person of ordinary skill in the art that they may still make modifications to the technical solutions described in the foregoing embodiments or make equivalent replacements to some technical features thereof, without departing from the spirit and scope of the technical solutions of the embodiments of this application, which being included in the protection scope of this application.

What is claimed is:

1. A method for manufacturing an image sensor, comprising:

obtaining feature parameter sets of a plurality of filters corresponding to different wavelengths in a filter unit set, wherein the image sensor comprises at least one filter unit set, the image sensor is manufactured in one of candidate manufacturing methods, and the feature parameter sets correspond to the candidate manufacturing methods;

inputting the feature parameter sets corresponding to the plurality of filters and a preset parameter set into a feature vector conversion model, to obtain a plurality of feature vectors based on detection targets;

inputting the plurality of feature vectors into a detection model corresponding to an application scenario type associated with the image sensor, and calculating a corresponding detection accuracy; and selecting a feature parameter set of a filter unit set corresponding to a highest detection accuracy among detection accuracies corresponding to the candidate manufacturing methods, and using a candidate manufacturing method of the image sensor corresponding to the selected feature parameter set as an initial manufacturing method of the image sensor.

2. The method according to claim 1, wherein the selected feature parameter set comprises transmittance curves corresponding to the plurality of filters, and the preset parameter set comprises spectral curves of a plurality of light sources and reflectivity curves of the detection targets;

the inputting the feature parameter sets corresponding to the plurality of filters and a preset parameter set into a feature vector conversion model, to obtain feature vectors based on the detection targets comprises:

inputting the transmittance curves corresponding to the filters, the spectral curves of the plurality of light sources, and the reflectivity curves of the detection targets into the feature vector conversion model, to calculate feature values based on the detection targets, wherein the feature vector conversion model is:

$$DN_i = k \int_{\lambda_0}^{\lambda_1} S(\lambda) \cdot R_i(\lambda) \cdot T_i(\lambda) \cdot \eta(\lambda) d\lambda,$$

wherein DNS is a feature value corresponding to an $i^{th}$ filter in the filter unit set; $S(\lambda)$ is a spectral curve of a light source; $R_i(\lambda)$ is a reflectivity curve of a detection target; $T_i(\lambda)$ is a transmittance curve of the $i^{th}$ filter; $\eta(\lambda)$ is a quantum efficiency curve of the image sensor; k is a photovoltaic conversion coefficient of the image sensor; and $\lambda 0$ and $\lambda 1$ are wave band ranges corresponding to a plurality of spectrums; and obtaining the feature vectors based on the feature values corresponding to the plurality of filters in the filter unit set.

3. The method according to claim 2, wherein after the selecting, the method further comprises:

iteratively optimizing the feature parameter sets of the plurality of filters corresponding to the initial manufacturing method of the image sensor to determine an optimal manufacturing method of the image sensor, by:

increasing a weight of a transmittance in an operating wave band in the transmittance curves of the plurality of filters, and obtaining updated feature parameter sets of the plurality of filters, wherein the operating wave band is determined based on the reflectivity curves of the detection targets.

4. The method according to claim 3, wherein the increasing the weight of the transmittance in the operating wave band in the transmittance curves of the plurality of filters, and obtaining the updated feature parameter sets of the plurality of filters further comprises:

inputting the updated feature parameter sets and the preset parameter set into the feature vector conversion model, to obtain a plurality of updated feature vectors based on the detection targets;

inputting the plurality of updated feature vectors into a liveness detection model, and calculating an updated detection accuracy; and adjusting shapes and amplitudes of the transmittance curves corresponding to the plurality of filters according to the updated detection accuracy.

5. The method according to claim 3, wherein before the increasing the weight of the transmittance in the operating wave band in the transmittance curves of the plurality of filters, and obtaining the updated feature parameter sets of the plurality of filters, the method further comprises:

obtaining reflectivity curves of the detection targets corresponding to the application scenario type;

determining discrete indicators corresponding to wave bands according to the reflectivity curves of the detection targets corresponding to the application scenario type; and selecting a wave band with a discrete indicator greater than a threshold as the operating wave band.

6. The method according to claim 2, wherein before the inputting the feature parameter sets corresponding to the plurality of filters and the preset parameter set into a feature vector conversion model, to obtain the plurality of feature vectors based on the detection targets, the method further comprises:

obtaining spectral curves corresponding to the plurality of light sources in different light source scenarios, to obtain a light source database;

determining reflectivity curves corresponding to the detection targets associated with the application scenario type in the different light source scenarios based on the light source database, to obtain a recognition object database; and generating the detection model based on the light source database and the recognition object database.

7. The method according to claim 1, wherein the application scenario type is a liveness recognition scenario type, and the inputting the plurality of feature vectors into a detection model corresponding to the application scenario type associated with the image sensor, and calculating a corresponding detection accuracy comprises:

obtaining a liveness recognition and detection model associated with the liveness recognition scenario type, wherein a liveness recognition score model is configured to determine an accuracy of liveness recognition using the plurality of feature vectors; and inputting the plurality of feature vectors into the liveness recognition and detection model, and performing liveness recognition using the image sensor, to calculate the corresponding detection accuracy.

8. A terminal device, comprising a memory, a processor, and a computer program stored in the memory and executable on the processor, and the processor, when executing the computer program, performs operations comprising:

obtaining feature parameter sets of a plurality of filters corresponding to different wavelengths in a filter unit set, wherein an image sensor comprises at least one filter unit set, the image sensor is manufactured in one of candidate manufacturing methods, and the feature parameter sets correspond to the candidate manufacturing methods;

inputting the feature parameter sets corresponding to the plurality of filters and a preset parameter set into a feature vector conversion model, to obtain a plurality of feature vectors based on detection targets;

inputting the plurality of feature vectors into a detection model corresponding to an application scenario type associated with the image sensor, and calculating a corresponding detection accuracy; and selecting a feature parameter set of a filter unit set corresponding to a highest detection accuracy among detection accuracies corresponding to the candidate manufacturing methods, and using a candidate manufacturing method of the image sensor corresponding to the selected feature parameter set as an initial manufacturing method of the image sensor.

9. The terminal device according to claim 8, wherein the selected feature parameter set comprises transmittance curves corresponding to the plurality of filters, and the preset parameter set comprises spectral curves of a plurality of light sources and reflectivity curves of the detection targets;

the inputting the feature parameter sets corresponding to the plurality of filters and a preset parameter set into a feature vector conversion model, to obtain feature vectors based on the detection targets comprises:

inputting the transmittance curves corresponding to the filters, the spectral curves of the plurality of light sources, and the reflectivity curves of the detection targets into the feature vector conversion model, to calculate feature values based on the detection targets, wherein the feature vector conversion model is:

$$DN_i = k \int_{\lambda_0}^{\lambda_1} S(\lambda) \cdot R_i(\lambda) \cdot T_i(\lambda) \cdot \eta(\lambda) d\lambda,$$

wherein $DN_i$ is a feature value corresponding to an $i^{th}$ filter in the filter unit set; $S(\lambda)$ is a spectral curve of a light source; $R_i(\lambda)$ is a reflectivity curve of a detection target; $T_i(\lambda)$ is a transmittance curve of the $i^{th}$ filter; $\eta(\lambda)$ is a quantum efficiency curve of the image sensor; k is a photovoltaic conversion coefficient of the image sensor; and $\lambda 0$ and $\lambda 1$ are wave band ranges corresponding to a plurality of spectrums; and obtaining the feature vectors based on the feature values corresponding to the plurality of filters in the filter unit set.

10. The terminal device according to claim 9, wherein after the selecting, the operations further comprise:

iteratively optimizing the feature parameter sets of the plurality of filters corresponding to the initial manufacturing method of the image sensor to determine an optimal manufacturing method of the image sensor, by:

increasing a weight of a transmittance in an operating wave band in the transmittance curves of the plurality of filters, and obtaining updated feature parameter sets of the plurality of filters, wherein the operating wave band is determined based on the reflectivity curves of the detection targets.

11. The terminal device according to claim 10, wherein the increasing the weight of the transmittance in the operating wave band in the transmittance curves of the plurality of filters, and obtaining the updated feature parameter sets of the plurality of filters further comprises:

inputting the updated feature parameter sets and the preset parameter set into the feature vector conversion model, to obtain a plurality of updated feature vectors based on the detection targets;

inputting the plurality of updated feature vectors into a liveness detection model, and calculating an updated detection accuracy; and adjusting shapes and amplitudes of the transmittance curves corresponding to the plurality of filters according to the updated detection accuracy.

12. The terminal device according to claim 10, wherein before the increasing the weight of the transmittance in the operating wave band in the transmittance curves of the plurality of filters, and obtaining the updated feature parameter sets of the plurality of filters, the operations further comprise:

obtaining reflectivity curves of the detection targets corresponding to the application scenario type;

determining discrete indicators corresponding to wave bands according to the reflectivity curves of the detection targets corresponding to the application scenario type; and selecting a wave band with a discrete indicator greater than a threshold as the operating wave band.

13. The terminal device according to claim 9, wherein before the inputting the feature parameter sets corresponding to the plurality of filters and the preset parameter set into a feature vector conversion model, to obtain the plurality of feature vectors based on the detection targets, the operations further comprise:

obtaining spectral curves corresponding to the plurality of light sources in different light source scenarios, to obtain a light source database;

determining reflectivity curves corresponding to the detection targets associated with the application scenario type in the different light source scenarios based on the light source database, to obtain a recognition object database; and generating the detection model based on the light source database and the recognition object database.

14. The terminal device according to claim 8, wherein the application scenario type is a liveness recognition scenario type, and the inputting the plurality of feature vectors into a detection model corresponding to the application scenario type associated with the image sensor, and calculating a corresponding detection accuracy comprises:

obtaining a liveness recognition and detection model associated with the liveness recognition scenario type, wherein a liveness recognition score model is configured to determine an accuracy of liveness recognition using the plurality of feature vectors; and inputting the plurality of feature vectors into the liveness recognition and detection model, and performing liveness recognition using the image sensor, to calculate the corresponding detection accuracy.

15. A non-transitory computer-readable storage medium, storing a computer program, wherein the computer program, when executed by a processor, causes the processor to perform operations comprising:

obtaining feature parameter sets of a plurality of filters corresponding to different wavelengths in a filter unit set, wherein an image sensor comprises at least one filter unit set, the image sensor is manufactured in one of candidate manufacturing methods, and the feature parameter sets correspond to the candidate manufacturing methods;

inputting the feature parameter sets corresponding to the plurality of filters and a preset parameter set into a feature vector conversion model, to obtain a plurality of feature vectors based on detection targets;

inputting the plurality of feature vectors into a detection model corresponding to an application scenario type associated with the image sensor, and calculating a corresponding detection accuracy; and selecting a feature parameter set of a filter unit set corresponding to a highest detection accuracy among detection accuracies corresponding to the candidate manufacturing methods, and using a candidate manufacturing method of the image sensor corresponding to the selected feature parameter set as an initial manufacturing method of the image sensor.

16. The medium according to claim 15, wherein the selected feature parameter set comprises transmittance curves corresponding to the plurality of filters, and the preset parameter set comprises spectral curves of a plurality of light sources and reflectivity curves of the detection targets;

the inputting the feature parameter sets corresponding to the plurality of filters and a preset parameter set into a feature vector conversion model, to obtain feature vectors based on the detection targets comprises:

inputting the transmittance curves corresponding to the filters, the spectral curves of the plurality of light sources, and the reflectivity curves of the detection targets into the feature vector conversion model, to calculate feature values based on the detection targets, wherein the feature vector conversion model is:

$$DN_i = k \int_{\lambda_0}^{\lambda_1} S(\lambda) \cdot R_i(\lambda) \cdot T_i(\lambda) \cdot \eta(\lambda) d\lambda,$$

wherein $DN_i$ is a feature value corresponding to an $i^{th}$ filter in the filter unit set; $S(\lambda)$ is a spectral curve of a light source; $R_i(\lambda)$ is a reflectivity curve of a detection target; $T_i(\lambda)$ is a transmittance curve of the $i^{th}$ filter; $\eta(\lambda)$ is a quantum efficiency curve of the image sensor; k is a photovoltaic conversion coefficient of the image sensor; and $\lambda 0$ and $\lambda 1$ are wave band ranges corresponding to a plurality of spectrums; and obtaining the feature vectors based on the feature values corresponding to the plurality of filters in the filter unit set.

17. The medium according to claim 16, wherein after the selecting, the operations further comprise:

iteratively optimizing the feature parameter sets of the plurality of filters corresponding to the initial manufacturing method of the image sensor to determine an optimal manufacturing method of the image sensor, by:

increasing a weight of a transmittance in an operating wave band in the transmittance curves of the plurality of filters, and obtaining updated feature parameter sets of the plurality of filters, wherein the operating wave band is determined based on the reflectivity curves of the detection targets.

18. The medium according to claim 17, wherein the increasing the weight of the transmittance in the operating wave band in the transmittance curves of the plurality of filters, and obtaining the updated feature parameter sets of the plurality of filters further comprises:

Inputting the updated feature parameter sets and the a preset parameter set into the feature vector conversion model, to obtain a plurality of updated feature vectors based on the detection targets;

inputting the plurality of updated feature vectors into a liveness detection model, and calculating an updated detection accuracy; and adjusting shapes and amplitudes of the transmittance curves corresponding to the plurality of filters according to the updated detection accuracy.

19. The medium according to claim 17, wherein before the increasing the weight of the transmittance in the operating wave band in the transmittance curves of the plurality of filters, and obtaining the updated feature parameter sets of the plurality of filters, the operations further comprise:

obtaining reflectivity curves of the detection targets corresponding to the application scenario type;

determining discrete indicators corresponding to wave bands according to the reflectivity curves of the detection targets corresponding to the application scenario type; and selecting a wave band with a discrete indicator greater than a threshold as the operating wave band.

20. The medium according to claim 16, wherein before the inputting the feature parameter sets corresponding to the plurality of filters and the preset parameter set into a feature vector conversion model, to obtain the plurality of feature vectors based on the detection targets, the operations further comprise:

obtaining spectral curves corresponding to the plurality of light sources in different light source scenarios, to obtain a light source database;

determining reflectivity curves corresponding to the detection targets associated with the application scenario type in the different light source scenarios based on the light source database, to obtain a recognition object database; and generating the detection model based on the light source database and the recognition object database.

* * * * *